(12) United States Patent
Hsueh et al.

(10) Patent No.: US 8,743,480 B2
(45) Date of Patent: Jun. 3, 2014

(54) OPTICAL IMAGE CAPTURING LENS ASSEMBLY

(71) Applicant: Largan Precision Co., Ltd., Taichung (TW)

(72) Inventors: Chun-Che Hsueh, Taichung (TW); Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 68 days.

(21) Appl. No.: 13/677,319

(22) Filed: Nov. 15, 2012

(65) Prior Publication Data

US 2014/0063621 A1    Mar. 6, 2014

(30) Foreign Application Priority Data

Aug. 30, 2012   (TW) .............................. 101131585 A

(51) Int. Cl.
*G02B 13/18* (2006.01)

(52) U.S. Cl.
CPC ..................................... *G02B 13/18* (2013.01)
USPC ........................................................ 359/714

(58) Field of Classification Search
CPC ........ G02B 13/18; G02B 9/60; G02B 13/002; G02B 13/0045

USPC .......................................................... 359/714
See application file for complete search history.

(56) References Cited

U.S. PATENT DOCUMENTS 7,697,220 B2 * 4/2010 Iyama .......................... 359/753
2005/0231817 A1   10/2005 Matsusaka et al.

FOREIGN PATENT DOCUMENTS

| JP | 2004-318104 A | 11/2004 |
| JP | 2006-039063 A | 2/2006 |
| JP | 2007-187737 A | 7/2007 |
| JP | 2009-025380 A | 2/2009 |

* cited by examiner

*Primary Examiner* — Joseph P Martinez
(74) *Attorney, Agent, or Firm* — CKC & Partners Co., Ltd.

(57) ABSTRACT

An optical image capturing lens assembly includes, in order from an object side to an image side, a first lens element, a second lens element, a third lens element, a fourth lens element and a fifth lens element. The first lens element with refractive power has a concave object-side surface, and the object-side surface changes from concave at a paraxial region to convex at a peripheral region. The second lens element has refractive power. The third lens element has positive refractive power. The fourth lens element has negative refractive power. The fifth lens element with positive refractive power has a convex object-side surface and a concave image-side surface, wherein the image-side surface changes from concave at a paraxial region to convex at a peripheral region. The object-side surfaces and the image-side surfaces of the first and fifth lens elements are aspheric.

30 Claims, 20 Drawing Sheets

OPTICAL IMAGE CAPTURING LENS ASSEMBLY

RELATED APPLICATIONS

The application claims priority to Taiwan Application Serial Number 101131585, filed on Aug. 30, 2012, which is herein incorporated by reference.

BACKGROUND

1. Technical Field

The present disclosure relates to an optical image capturing lens assembly. More particularly, the present disclosure relates to a compact optical image capturing lens assembly applicable to electronic products.

2. Description of Related Art

In recent years, with the popularity of mobile products with camera functionalities, the demand for a miniaturized optical lens assembly is increasing. The sensor of a conventional photographing camera is typically a CCD (Charge-Coupled Device) image sensor or a CMOS (Complementary Metal-Oxide Semiconductor) sensor. As advanced semiconductor manufacturing technologies have allowed the pixel size of sensors to be reduced and compact optical lens assemblies have gradually evolved toward the field of higher megapixels, there is an increasing demand for optical lens assemblies featuring better image quality.

A conventional compact optical lens assembly employed in a portable electronic product mainly adopts a four-element lens structure such as the one disclosed in U.S. Pat. No. 8,179,470. Due to the popularity of mobile products with high-end specifications, such as smart phones and PDAs (Personal Digital Assistants), the pixel and image-quality requirements of the compact optical lens assembly have increased rapidly. However, the conventional four-element lens structure cannot satisfy the requirements of the compact optical lens assembly with high-end specifications.

Although another conventional optical lens assembly with five-element lens structure such as the one disclosed in U.S. Pat. No. 8,000,031 is provided. However, the object-side surface of the first lens element without being concave for enlarging a field of view of the optical lens assembly, thus the field of view is constrained. Moreover, the shape design of the surfaces of the lens elements cannot correct the distortion, so that the image quality is reduced.

SUMMARY

According to one aspect of the present disclosure, an optical image capturing lens assembly includes, in order from an object side to an image side, a first lens element, a second lens element, a third lens element, a fourth lens element and a fifth lens element. The first lens element with refractive power has a concave object-side surface at a paraxial region, wherein the object-side surface of the first lens element changes from concave at the paraxial region to convex at a peripheral region, and the object-side surface and an image-side surface of the first lens element are aspheric. The second lens element has refractive power. The third lens element has positive refractive power. The fourth lens element has negative refractive power. The fifth lens element with positive refractive power has a convex object-side surface at a paraxial region and a concave image-side surface at a paraxial region, wherein the image-side surface changes from concave at the paraxial region to convex at a peripheral region, and the object-side surface and the image-side surface of the fifth lens element are aspheric.

According to another aspect of the present disclosure, an optical image capturing lens assembly includes, in order from an object side to an image side, a first lens element, a second lens element, a third lens element, a fourth lens element and a fifth lens element. The first lens element with refractive power has a concave object-side surface at a paraxial region, wherein the object-side surface and an image-side surface of the first lens element are aspheric. The second lens element has refractive power. The third lens element with positive refractive power. The fourth lens element with negative refractive power. The fifth lens element with positive refractive power has a convex object-side surface at a paraxial region and a concave image-side surface at a paraxial region, wherein the image-side surface of the fifth lens element changes from concave at the paraxial region to convex at a peripheral region, and the object-side surface and the image-side surface of the fifth lens element are aspheric. When an optical effective radius of the object-side surface of the first lens element is Y11, and an optical effective radius of the image-side surface of the fifth lens element is Y52, the following relationship is satisfied:

$$0.7 < |Y11/Y52| < 1.2.$$

According to still another aspect of the present disclosure, an optical image capturing lens assembly includes, in order from an object side to an image side, a first lens element, a second lens element, a third lens element, a fourth lens element and a fifth lens element. The first lens element with refractive power has a concave object-side surface at a paraxial region, wherein the object-side surface of the first lens element changes from concave at the paraxial region to convex at a peripheral region, and the object-side surface and an image-side surface of the first lens element are aspheric. The second lens element with refractive power. The third lens element has positive refractive power. The fourth lens element has negative refractive power. The fifth lens element with positive refractive power has a convex object-side surface at a paraxial region and a concave image-side surface at a paraxial region, wherein the image-side surface of the fifth lens element changes from concave at the paraxial region to convex at a peripheral region, and the object-side surface and the image-side surface of the fifth lens element are aspheric. When a minimum distance between an optical axis and an non-axial critical point on the object-side surface of the first lens element is Yc11, a distance parallel to the optical axis between the optical axis and the non-axial critical point on the object-side surface of the first lens element is SAGc11, a minimum distance between the optical axis and a non-axial critical point on the image-side surface of the fifth lens element is Yc52, a distance parallel to the optical axis between the optical axis and the non-axial critical point on the image-side surface of the fifth lens element is SAGc52, wherein SAGc11/Yc11 is a tangent value of an angle $\theta_1$, and SAGc52/Yc52 is a tangent value of an angle $\theta_2$, the following relationships are satisfied:

$$0 < \tan \theta_1 < 0.3; \text{ and}$$

$$0 < \tan \theta_2 < 0.5.$$

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
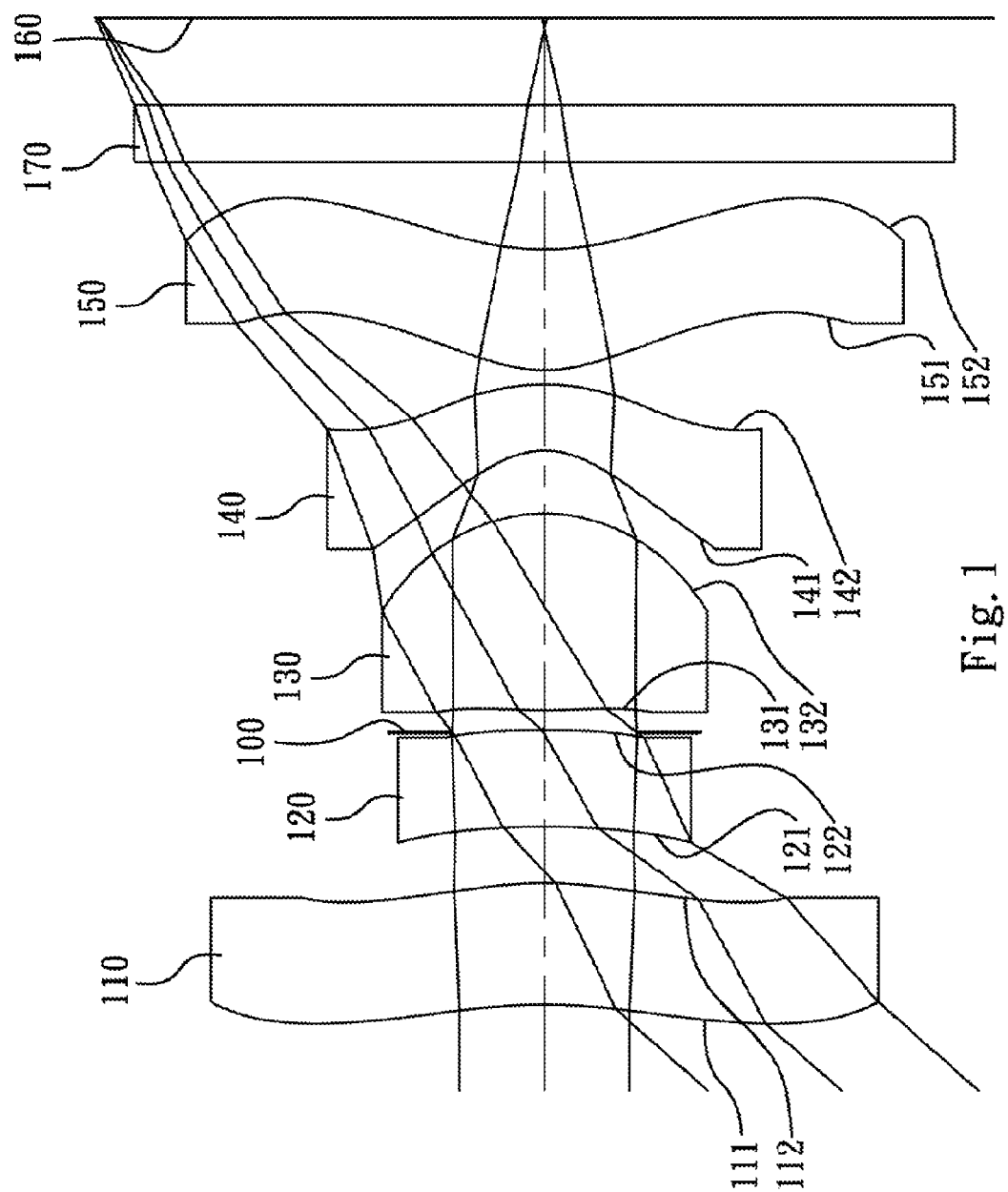
FIG. 1 is a schematic view of an optical image capturing lens assembly according to the 1st embodiment of the present disclosure.

An optical image capturing lens assembly includes, in order from an object side to an image side, a first lens element, a second lens element, a third lens element, a fourth lens element and a fifth lens element.

The first lens element with positive refractive power has a concave object-side surface at a paraxial region and a convex image-side surface at a paraxial region, thus it is favorable for enlarging the field of view of the optical image capturing lens assembly. Furthermore, the object-side surface of the first lens element changes from concave at the paraxial region to convex at a peripheral region, so that the distortion of the optical image capturing lens assembly due to the larger field of view can be reduced, thereby the image quality loss can be minimized.

The third lens element with positive refractive power can have a convex image-side surface at a paraxial region, which can thereby enhance the positive refractive power for the optical image capturing lens assembly, so that the total track length of the optical image capturing lens assembly can be properly adjusted.

The fourth lens element with negative refractive power can have a concave object-side surface at a paraxial region and a convex image-side surface at a paraxial region, so that the astigmatism and other various aberrations of the optical image capturing lens assembly can be corrected.

The fifth lens element can have positive refractive power and has a convex object-side surface at a paraxial region and a concave image-side surface at a paraxial region. Therefore, a principal point of the optical image capturing lens assembly can be positioned away from an image plane, and the total track length of the optical image capturing lens assembly can be reduced. Furthermore, the image-side surface of the fifth lens element changes from concave at the paraxial region to convex at a peripheral region. Therefore, the angle of the incident light from a peripheral region to the image plane can be corrected, so that the relative illumination (RI) of the optical image capturing lens assembly can be enhanced as well as the higher resulting image quality.

When a minimum distance between an optical axis and a non-axial critical point on the image-side surface of the fifth lens element is Yc52, and an optical effective radius of the image-side surface of the fifth lens element is Y52, the following relationship is satisfied: $0.60 < |Yc52/Y52| \leq 1.0$. Therefore, the aberration of the central field and the off-axis field can be effectively corrected.

When a focal length of the optical image capturing lens assembly is f, a focal length of the first lens element is f1, and a focal length of the second lens element is f2, the following relationship is satisfied: $0 < |f/f1| + |f/f2| < 0.8$. Therefore, the refractive power distribution of the first lens element and the second lens element is proper for reducing the total track length of the optical image capturing lens assembly and the aberration thereof can be corrected.

When an optical effective radius of the object-side surface of the first lens element is Y11, and the optical effective radius of the image-side surface of the fifth lens element is Y52, the following relationship is satisfied: $0.7 < |Y11/Y52| < 1.2$. Therefore, the field of view of the optical image capturing lens assembly can be properly adjusted for reducing the distortion thereof, and the angle of the incident light from a peripheral region to the image plane can be corrected for improving the image quality.

When a curvature radius of an image-surface of the third lens element is R6, and a central thickness of the third lens element is CT3, the following relationship is satisfied: $-1.3 < R6/CT3 < -0.50$. Therefore, the total track length of the optical image capturing lens assembly can be reduced by proper adjusting the thickness of the lens element, and the spherical aberration thereof can be corrected as well.

When a minimum distance between the optical axis and a non-axial critical point on the object-side surface of the first lens element is Yc11, and the optical effective radius of the object-side surface of the first lens element is Y11, the following relationship is satisfied: $0.55 < |Yc11/Y11| \le 1.0$. Therefore, the distortion of the optical image capturing lens assembly can be reduced for preventing the loss of the image quality.

When the minimum distance between the optical axis and the non-axial critical point on the object-side surface of the first lens element is Yc11, a distance parallel to the optical axis between the optical axis and the non-axial critical point on the object-side surface of the first lens element is SAGc11, wherein SAGc11/Yc11 is a tangent value of an angle $\theta_1$, and the following relationship is satisfied: $0 < \tan \theta_1 < 0.30$. Therefore, the distortion of the optical image capturing lens assembly due to increase of the field of view can be corrected by the dramatic variant of the object-side surface of the first lens element, and the image loss can be reduced.

When an Abbe number of the third lens element is V3, and an Abbe number of the fourth lens element is V4, the following relationship is satisfied: $25.0 < V3 - V4 < 48.0$. Therefore, the chromatic aberration of the optical image capturing lens assembly can be corrected. Preferably, V3 and V4 can satisfy to the following relationship: $32.0 < V3 - V4 < 48.0$.

When a maximal field of view of the optical image capturing lens assembly is FOV, the following relationship is satisfied: 80 degrees < FOV < 115 degrees. Therefore, the proper field of view of the optical image capturing lens assembly can be obtained.

When a maximal distortion of an imaging range of the optical image capturing lens assembly is Dist_max, the following relationship is satisfied: $|Dist\_max| < 3\%$. Therefore, the distortion of the optical image capturing lens assembly can be reduced for improving the image quality.

When the minimum distance between the optical axis and the non-axial critical point on the object-side surface of the first lens element is Yc11, a distance parallel to the optical axis between the optical axis and the non-axial critical point on the object-side surface of the first lens element is SAGc11, a minimum distance between the optical axis and a non-axial critical point on the image-side surface of the fifth lens element is Yc52, a distance parallel to the optical axis between the optical axis and the non-axial critical point on the image-side surface of the fifth lens element is SAGc52, wherein SAGc11/Yc11 is a tangent value of the angle $\theta_1$, and SAGc52/Yc52 is a tangent value of an angle $\theta_2$, the following relationship is satisfied: $\tan \theta_1 < \tan \theta_2$. Therefore, the distortion of the optical image capturing can be reduced, and the field of view thereof can be properly adjusted. Moreover, the aberration of the central field and the off-axis field can be corrected for improving the image quality.

When a curvature radius of the object-side surface of the first lens element is Ro1, a curvature radius of the image-side surface of the first lens element is Ri1, a curvature radius of an object-side surface of the second lens element is Ro2, a curvature radius of an image-side surface of the second lens element is Ri2, a curvature radius of an object-side surface of the third lens element is Ro3, the curvature radius of the image-side surface of the third lens element is Ri3, a curvature radius of the object-side surface of the fourth lens element is Ro4, a curvature radius of the image-side surface of the fourth lens element is Ri4, a curvature radius of the object-side surface of the fifth lens element is Ro5, a curvature radius of the image-side surface of the fifth lens element is Ri5, and the following relationships are satisfied: $0 < Ro1/Ri1$; $0 < Ro2/Ri2$; $0 < Ro3/Ri3$; $0 < Ro4/Ri4$; and $0 < Ro5/Ri5$. Therefore, the astigmatism of the optical image capturing lens assembly can be corrected for improving the image quality thereof.

When the minimum distance between the optical axis and the non-axial critical point on the image-side surface of the fifth lens element is Yc52, the distance parallel to the optical axis between the optical axis and the non-axial critical point on the image-side surface of the fifth lens element is SAGc52, wherein SAGc52/Yc52 is a tangent value of an angle $\theta_2$, the following relationships are satisfied: $0 < \tan \theta_2 < 0.5$. Therefore, the angle of the incident light from a peripheral region to the image plane can be corrected by the dramatic variance of the image-side surface of the fifth lens element, so that the significant drop of the relative illumination (RI) of the optical image capturing lens assembly can be prevented, and the image quality can be enhanced as well.

According to the optical image capturing lens assembly of the present disclosure, the lens elements thereof can be made of plastic material or glass. When the lens elements are made of glass material, the allocation of the refractive power of the optical image capturing lens assembly may be more flexible and easier to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and aberrations are reduced, and the number of required lens elements can be reduced while constructing an optical system. Therefore, the total track length of the optical image capturing lens assembly can also be reduced.

According to the optical image capturing lens assembly of the present disclosure, each of an object-side surface and an image-side surface of every lens element has a paraxial region and a peripheral region. The paraxial region refers to the region of the surface where light rays travel close to an optical axis and the peripheral region refers to the region of the surface where light rays travel away from the optical axis. Particularly, when a lens element has a convex surface, it indicates that the surface is convex at the paraxial region; and when the lens element has a concave surface, it indicates that the surface is concave at the paraxial region.

According to the optical image capturing lens assembly of the present disclosure, a critical point is a non-axial point of the lens surface where its tangent is perpendicular to the optical axis.

According to the optical image capturing lens assembly of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the system to an image plane and thereby the generated telecentric effect improves the image-sensing efficiency of an image sensor. A middle stop is favorable for enlarging the field of view of the system and thereby provides a wider field of view for the same.

According to the above description of the present disclosure, the following 1st-9th specific embodiments are provided for further explanation.

1st Embodiment

Figure 2:
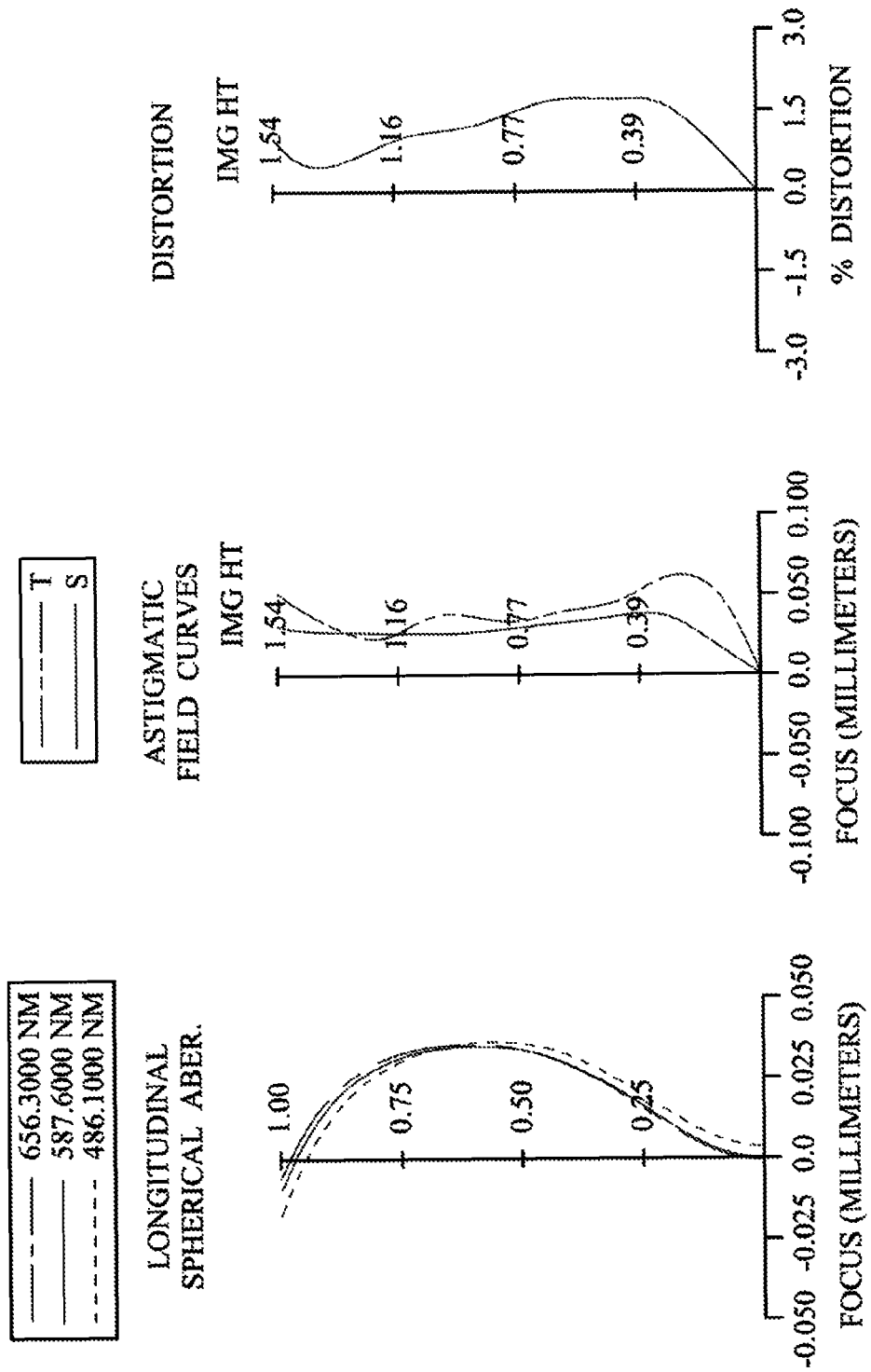
FIG. 2 shows spherical aberration curves, astigmatic field curves and a distortion curve of the optical image capturing lens assembly according to the 1st embodiment.

FIG. 1 is a schematic view of an optical image capturing lens assembly according to the 1st embodiment of the present disclosure. FIG. 2 shows spherical aberration curves, astigmatic field curves and a distortion curve of the optical image capturing lens assembly according to the 1st embodiment. In FIG. 1, the optical image capturing lens assembly includes, in order from an object side to an image side, a first lens element 110, a second lens element 120, an aperture stop 100, a third lens element 130, a fourth lens element 140, a fifth lens element 150, an IR-cut filter 170, and an image plane 160.

The first lens element 110 with positive refractive power has a concave object-side surface 111 at a paraxial region and a convex image-side surface 112 at a paraxial region, wherein the object-side surface 111 changes from concave at the paraxial region to convex at a peripheral region. The first lens element 110 is made of plastic material and has the object-side surface 111 and the image-side surface 112 being aspheric.

The second lens element 120 with negative refractive power has a to concave object-side surface 121 and a convex image-side surface 122. The second lens element 120 is made of plastic material and has the object-side surface 121 and the image-side surface 122 being aspheric.

The third lens element 130 with positive refractive power has a convex object-side surface 131 at a paraxial region and a convex image-side surface 132 at a paraxial region. The third lens element 130 is made of plastic material and has the object-side surface 131 and the image-side surface 132 being aspheric.

The fourth lens element 140 with negative refractive power has a concave object-side surface 141 at a paraxial region and a convex image-side surface 142 at a paraxial region. The fourth lens element 140 is made of plastic material and has the object-side surface 141 and the image-side surface 142 being aspheric.

The fifth lens element 150 with positive refractive power has a convex object-side surface 151 at a paraxial region and a concave image-side surface 152 at a paraxial region, wherein the image-side surface 152 changes from concave at the paraxial region to convex at a peripheral region. The fifth lens element 150 is made of plastic material and has the object-side surface 151 and the image-side surface 152 being aspheric.

The IR-cut filter 170 is made of glass material, wherein the IR-cut filter 170 is located between the fifth lens element 150 and the image plane 160, and will not affect the focal length of the optical image capturing lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

wherein,

X is the relative distance of a point on the aspheric surface spaced at a distance Y from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the optical image capturing lens assembly according to the 1st embodiment, when a focal length of the optical image capturing lens assembly is f, an f-number of the optical image capturing lens assembly is Fno, and half of a maximal field of view of the optical image capturing lens assembly is HFOV, these parameters have the following values:

f=1.35 mm;
Fno=2.30; and
HFOV=48.1 degrees.

In the optical image capturing lens assembly according to the 1st embodiment, when an Abbe number of the third lens element 130 is V3, and an Abbe number of the fourth lens element 140 is V4, the following relationship is satisfied:

$$V3-V4=32.6.$$

In the optical image capturing lens assembly according to the 1st embodiment, when a curvature radius of the image-side surface 132 of the third to lens element 130 is R6, and a central thickness of the third lens element 130 is CT3, the following relationship is satisfied:

$$R6CT3=-0.86.$$

In the optical image capturing lens assembly according to the 1st embodiment, when the focal length of the optical image capturing lens assembly is f, a focal length of the first lens element 110 is f1, and a focal length of the second lens element 120 is f2, the following relationship is satisfied:

$$|f/f1|+|f/f2|=0.35.$$

Figure 20:
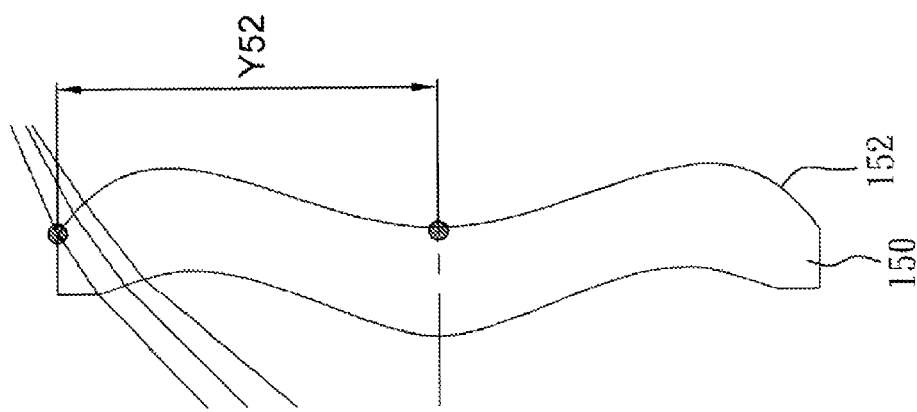
FIG. 20 is a schematic view of Y52 of the fifth lens element according to the 1st embodiment of the present disclosure.
Figure 19:
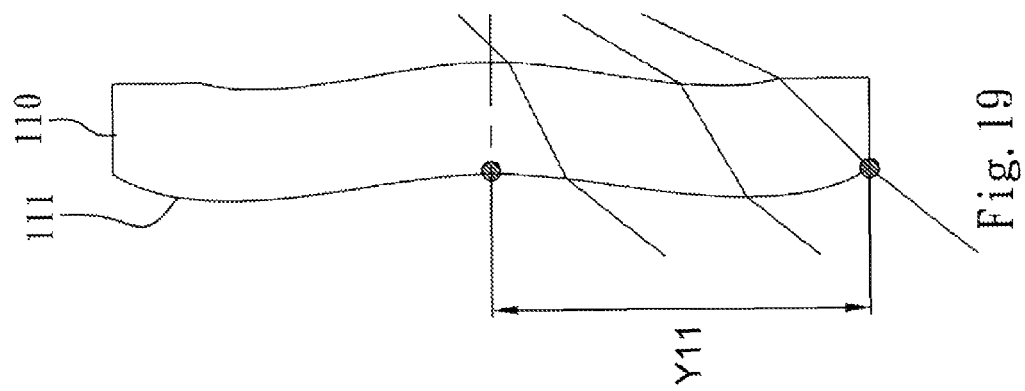
FIG. 19 is a schematic view of Y11 of the first lens element according to the 1st embodiment of the present disclosure.

FIG. 19 is a schematic view of Y11 of the first lens element 110 according to the 1st embodiment of the present disclosure, and FIG. 20 is a schematic view of Y52 of the fifth lens element 150 according to the 1st embodiment of the present disclosure. In FIG. 19 and FIG. 20, when an optical effective radius of the object-side surface 110 of the first lens element 110 is Y11, and an optical effective radius of the image-side surface 152 of the fifth lens element 150 is Y52, the following relationship is satisfied:

$$|Y11/Y52|=0.93.$$

In the optical image capturing lens assembly according to the 1st embodiment, when a minimum distance between an optical axis and an non-axial critical point on the object-side surface 111 of the first lens element 110 is Yc11, and the optical effective radius of the object-side surface 111 of the first lens element 110 is Y11, the following relationship is satisfied:

$$|Yc11/Y11|=0.68.$$

Figure 21:
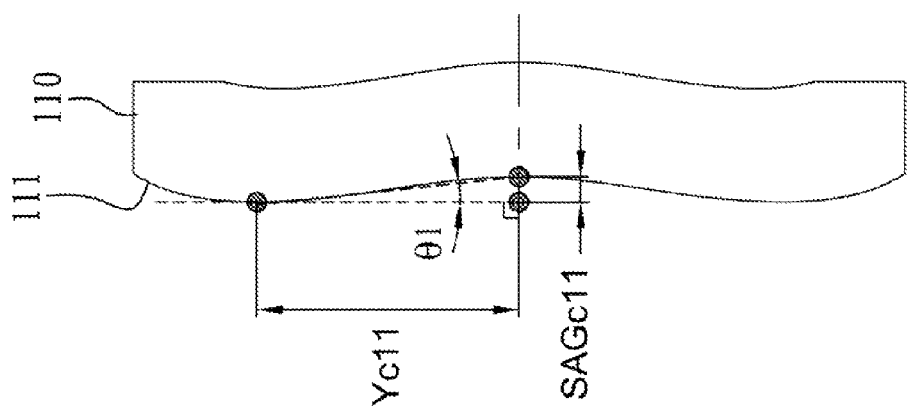
FIG. 21 is a schematic view of Yc11 and SAGc11 according to the 1st embodiment of the present disclosure.

FIG. 21 is a schematic view of Yc11 and SAGc11 according to the 1st embodiment of the present disclosure. In FIG. 21, when the minimum distance between the optical axis and the non-axial critical point on the object-side to surface 111 of the first lens element 110 is Yc11, and a distance parallel to the optical axis between the optical axis and the non-axial critical point on the object-side surface 111 of the first lens element 110 is SAGc11, wherein SAGc11/Yc11 is a tangent value of an angle $\theta_1$, the following relationship is satisfied: tan $\theta_1$=0.083.

Figure 22:
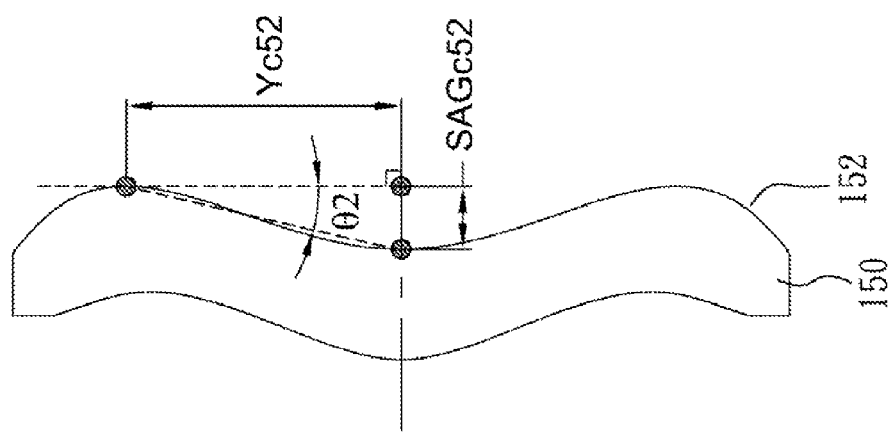
FIG. 22 is a schematic view of Yc52 and SAGc52 according to the 1st embodiment of the present disclosure.

FIG. 22 is a schematic view of Yc52 and SAGc52 according to the 1st embodiment of the present disclosure. In FIG. 22, when a minimum distance between the optical axis and a non-axial critical point on the image-side surface 152 of the fifth lens element 150 is Yc52, a distance parallel to the optical axis between the optical axis and the non-axial critical point on the image-side surface 152 of the fifth lens element 150 is SAGc52, wherein SAGc52/Yc52 is a tangent value of an angle $\theta_2$, the following relationship is satisfied:

$$\tan\theta_2=0.198.$$

In the optical image capturing lens assembly according to the 1st embodiment, when a maximal distortion of an imaging range of the optical image capturing lens assembly is Dist_max, the following relationship is satisfied:

|Dist_max|=1.73%.

In the optical image capturing lens assembly according to the 1st embodiment, when a maximal field of view of the optical image capturing lens assembly is FOV, the following relationship is satisfied:

FOV=96.2 deg.

The detailed optical data of the 1st embodiment are shown in Table 1 and the aspheric surface data are shown in Table 2 below.

TABLE 1

1st Embodiment
f = 1.35 mm, Fno = 2.30, HFOV = 48.1 deg.

| Surface # |  | Curvature Radius |  | Thickness | Material | Index | Abbe # | Focal length |
|---|---|---|---|---|---|---|---|---|
| 0 | Object | Plano |  | Infinity |  |  |  |  |
| 1 | Lens 1 | −1.840 | ASP | 0.421 | Plastic | 1.544 | 55.9 | 7.03 |
| 2 |  | −1.343 | ASP | 0.195 |  |  |  |  |
| 3 | Lens 2 | −2.497 | ASP | 0.334 | Plastic | 1.544 | 55.9 | −8.88 |
| 4 |  | −5.408 | ASP | −0.007 |  |  |  |  |
| 5 | Ape. Stop | Plano |  | 0.076 |  |  |  |  |
| 6 | Lens 3 | 2.844 | ASP | 0.680 | Plastic | 1.544 | 55.9 | 0.96 |
| 7 |  | −0.584 | ASP | 0.216 |  |  |  |  |
| 8 | Lens 4 | −0.280 | ASP | 0.230 | Plastic | 1.640 | 23.3 | −0.80 |
| 9 |  | −0.823 | ASP | 0.050 |  |  |  |  |
| 10 | Lens 5 | 0.460 | ASP | 0.418 | Plastic | 1.535 | 56.3 | 1.26 |
| 11 |  | 0.988 | ASP | 0.300 |  |  |  |  |
| 12 | IR-cut filter | Plano |  | 0.200 | Glass | 1.517 | 64.2 | — |
| 13 |  | Plano |  | 0.299 |  |  |  |  |
| 14 | Image | Plano |  | — |  |  |  |  |

Reference wavelength (d-line) is 587.6 nm.

TABLE 2

Aspheric Coefficients

| Surface # | | | | | |
|---|---|---|---|---|---|
|  | 1 | 2 | 3 | 4 | 6 |
| k = | −1.9058E+01 | −1.7958E+01 | −9.7265E+00 | −3.8784E−01 | −2.0000E+01 |
| A4 = | 1.4307E−01 | 2.4258E−01 | 4.5369E−01 | −1.4721E+00 | −1.6241E+00 |
| A6 = | −5.7100E−02 | −3.4762E−01 | −7.2254E+00 | 6.5632E+00 | 6.1086E+00 |
| A8 = | −9.5232E−04 | 7.6333E−01 | 4.4584E+01 | −4.9072E+01 | −1.1799E+02 |
| A10 = | 4.7196E−02 | −1.1559E+00 | −1.4547E+02 | 1.7567E+02 | 9.0473E+02 |
| A12 = | −3.3313E−02 | 1.1147E+00 | 1.8703E+02 | 1.9727E+02 | −3.3211E+03 |
| A14 = | 9.5335E−03 | −3.9452E−01 | 1.8050E−06 | −1.7745E−08 | 5.7411E+03 |

| Surface # | | | | | |
|---|---|---|---|---|---|
|  | 7 | 8 | 9 | 10 | 11 |
| k = | −8.4713E+00 | −3.2089E+00 | −4.5713E−01 | −6.6498E+00 | −6.2770E−01 |
| A4 = | −4.2585E+00 | −4.4993E+00 | −1.3120E+00 | 2.2444E−02 | −4.1170E−01 |
| A6 = | 2.0441E+01 | 3.8393E+01 | 1.4532E+01 | −9.3753E−01 | −5.1635E−01 |
| A8 = | −7.5608E+01 | −1.6042E+02 | −4.5596E+01 | 2.2387E+00 | 1.7230E+00 |
| A10 = | 1.4292E+02 | 3.6887E+02 | 8.0238E+01 | −3.1246E+00 | −2.3497E+00 |
| A12 = | −1.1122E+02 | −4.2582E+02 | −7.7193E+01 | 2.4619E+00 | 1.7006E+00 |
| A14 = | −3.0096E+00 | 1.6778E+02 | 3.1318E+01 | −9.9545E−01 | −6.5018E−01 |
| A16 = |  |  |  | 1.6347E−01 | 1.0352E−01 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
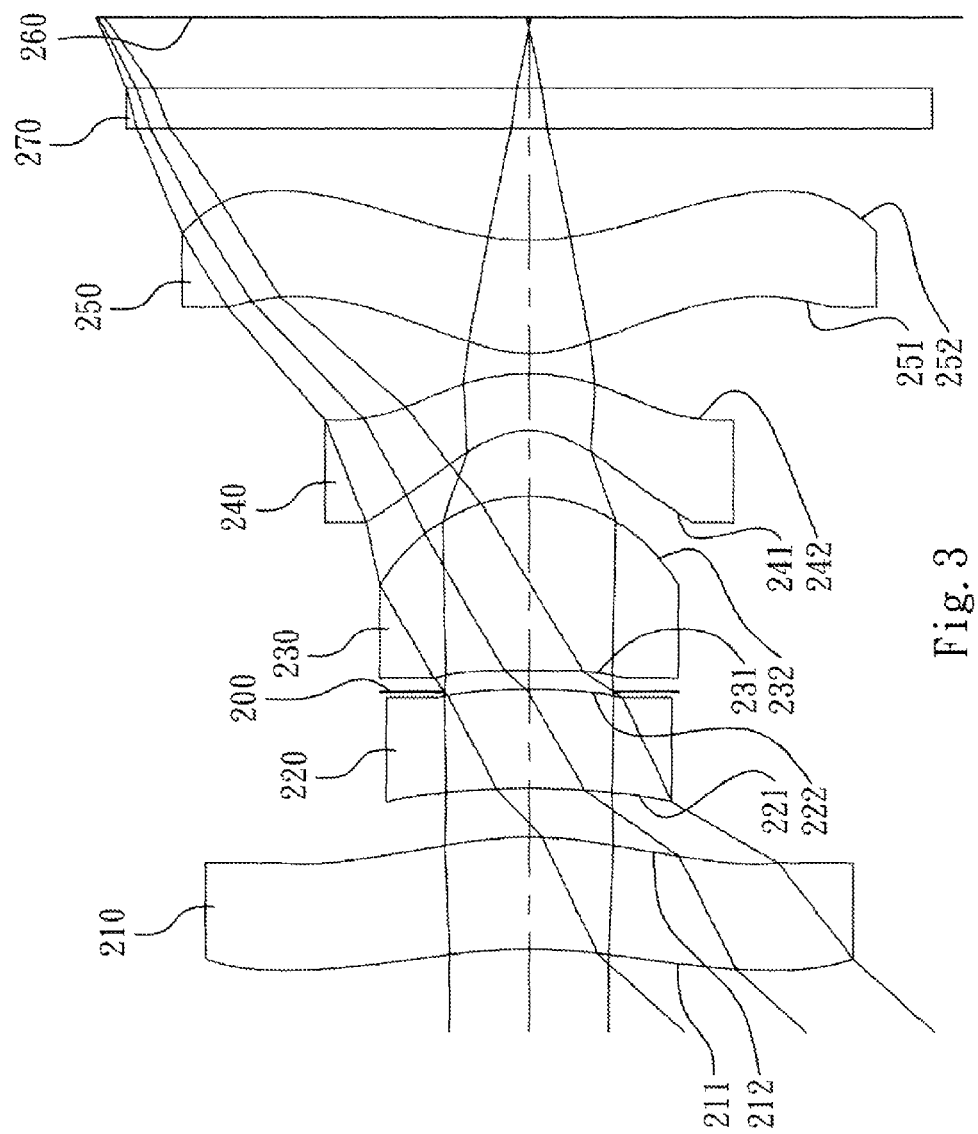
FIG. 3 is a schematic view of an optical image capturing lens assembly according to the 2nd embodiment of the present disclosure.
Figure 4:
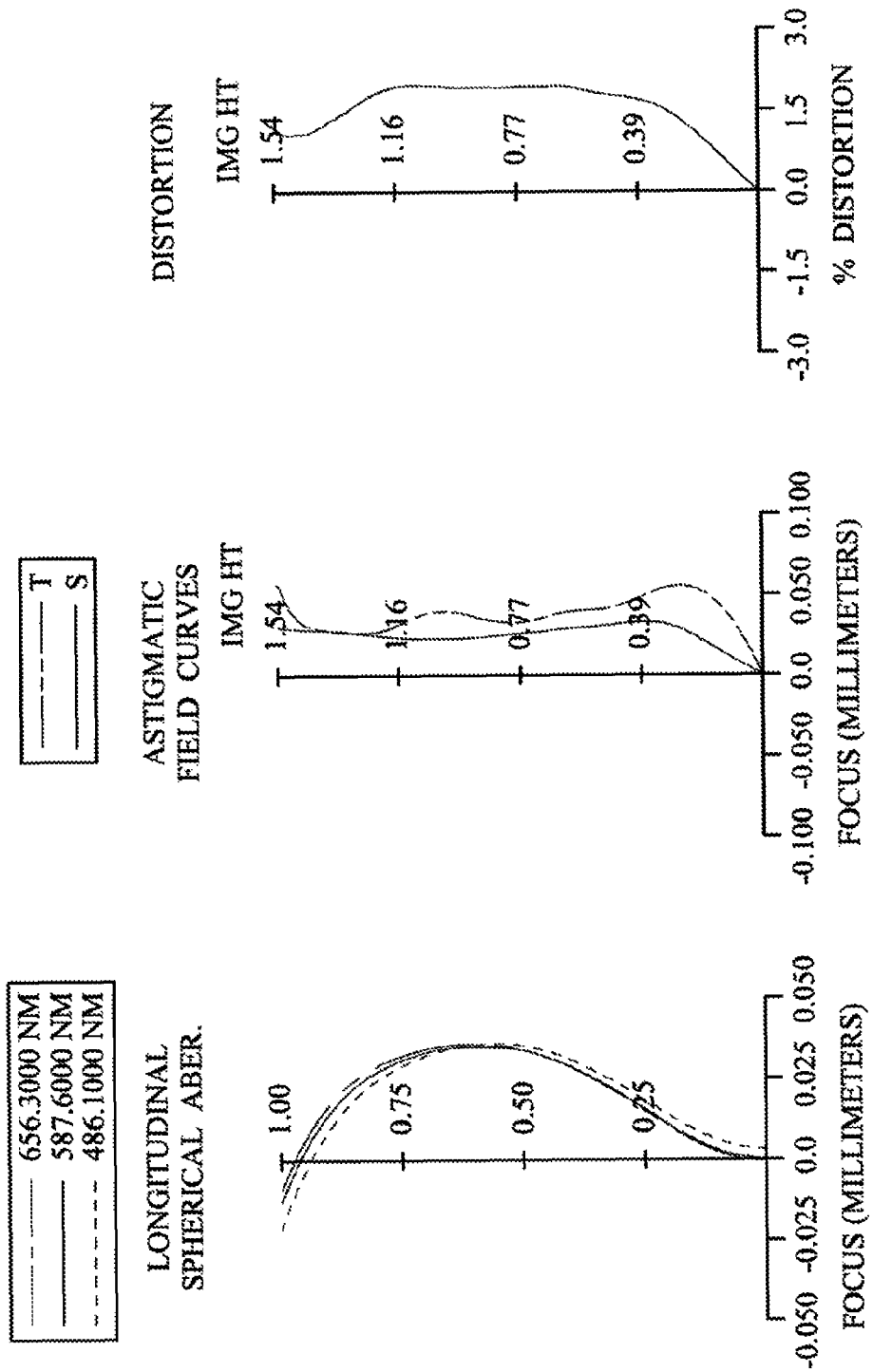
FIG. 4 shows spherical aberration curves, astigmatic field curves and a distortion curve of the optical image capturing lens assembly according to the 2nd Embodiment.

FIG. 3 is a schematic view of an optical image capturing lens assembly according to the 2nd embodiment of the present disclosure. FIG. 4 shows spherical aberration curves, astigmatic field curves and a distortion curve of the optical image capturing lens assembly according to the 2nd embodiment. In FIG. 3, the optical image capturing lens assembly includes, in order from an object side to an image side, a first lens element 210, a second lens element 220, an aperture stop 200, a third lens element 230, a fourth lens element 240, a fifth lens element 250, an IR-cut filter 270, and an image plane 260.

The first lens element 210 with positive refractive power has a concave object-side surface 211 at a paraxial region and a convex image-side surface 212 at a paraxial region, wherein the object-side surface 211 of the first lens element 210 changes from concave at the paraxial region to convex at a peripheral region. The first lens element 210 is made of plastic material and to has the object-side surface 211 and the image-side surface 212 being aspheric.

The second lens element 220 with negative refractive power has a concave object-side surface 221 and a convex image-side surface 222. The second lens element 220 is made of plastic material and has the object-side surface 221 and the image-side surface 222 being aspheric.

The third lens element 230 with positive refractive power has a concave object-side surface 231 at a paraxial region and a convex image-side surface 232 at a paraxial region. The third lens element 230 is made of plastic material and has the object-side surface 231 and the image-side surface 232 being aspheric.

The fourth lens element 240 with negative refractive power has a concave object-side surface 241 at a paraxial region and a convex image-side surface 242 at a paraxial region. The fourth lens element 240 is made of plastic material and has the object-side surface 241 and the image-side surface 242 being aspheric.

The fifth lens element 250 with positive refractive power has a convex object-side surface 251 at a paraxial region and a concave image-side surface 252 at a paraxial region, wherein the image-side surface 252 of the fifth lens element 250 changes from concave at the paraxial region to convex at a peripheral region. The fifth lens element 250 is made of plastic material and has the object-side surface 251 and the image-side surface 252 being aspheric.

The IR-cut filter 270 is made of glass material, wherein the IR-cut filter 270 is located between the fifth lens element 250 and the image plane 260, and will not affect the focal length of the optical image capturing lens assembly.

The detailed optical data of the 2nd embodiment are shown in Table 3 and the aspheric surface data are shown in Table 4 below.

TABLE 3

2nd Embodiment
f = 1.37 mm, Fno = 2.40, HFOV = 47.8 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −1.814 | ASP | 0.402 | Plastic | 1.544 | 55.9 | 5.28 |
| 2 | | −1.199 | ASP | 0.174 | | | | |
| 3 | Lens 2 | −2.494 | ASP | 0.354 | Plastic | 1.544 | 55.9 | −48.85 |
| 4 | | −2.890 | ASP | −0.008 | | | | |
| 5 | Ape. Stop | Plano | | 0.074 | | | | |
| 6 | Lens 3 | −38.715 | ASP | 0.626 | Plastic | 1.535 | 56.3 | 1.04 |
| 7 | | −0.553 | ASP | 0.233 | | | | |
| 8 | Lens 4 | −0.279 | ASP | 0.206 | Plastic | 1.640 | 23.3 | −0.81 |
| 9 | | −0.775 | ASP | 0.072 | | | | |
| 10 | Lens 5 | 0.459 | ASP | 0.406 | Plastic | 1.535 | 56.3 | 1.26 |
| 11 | | 0.995 | ASP | 0.400 | | | | |
| 12 | IR-cut filter | Plano | | 0.145 | Glass | 1.517 | 64.2 | — |
| 13 | | Plano | | 0.252 | | | | |
| 14 | Image | Plano | | — | | | | |

Reference wavelength (d-line) is 587.6 nm

TABLE 4

Aspheric Coefficients

| | Surface # | | | | |
|---|---|---|---|---|---|
| | 1 | 2 | 3 | 4 | 6 |
| k = | −1.9993E+01 | −1.5423E+01 | −7.6400E+00 | −2.0000E+01 | −1.0000E+00 |
| A4 = | 1.2251E−01 | 2.1088E−01 | 7.3291E−01 | −9.7557E−01 | −1.5200E+00 |
| A6 = | −6.0422E−02 | −4.3210E−01 | −8.5315E+00 | 3.5653E+00 | 3.8401E+00 |
| A8 = | −3.7085E−03 | 8.4550E−01 | 4.9375E+01 | −4.7098E+01 | −1.2602E+02 |
| A10 = | 4.6146E−02 | −1.0589E+00 | −1.5335E+02 | 2.1923E+02 | 9.8045E+02 |
| A12 = | −2.7574E−02 | 8.0556E−01 | 1.8703E+02 | 1.9727E+02 | −3.3211E+03 |
| A14 = | 6.4816E−03 | −2.4280E−01 | 1.8078E−06 | −1.8065E−08 | 5.7411E+03 |

TABLE 4-continued

Aspheric Coefficients

| Surface # | 7 | 8 | 9 | 10 | 11 |
|---|---|---|---|---|---|
| k = | −7.2804E+00 | −3.1047E+00 | −4.7538E−01 | −6.3024E+00 | −6.2583E−01 |
| A4 = | −4.3029E+00 | −4.4470E+00 | −1.2734E+00 | 1.7484E−02 | −3.9906E−01 |
| A6 = | 1.9927E+01 | 3.8595E+01 | 1.4567E+01 | −9.3319E−01 | −5.2273E−01 |
| A8 = | −7.5031E+01 | −1.6027E+02 | −4.5553E+01 | 2.2410E+00 | 1.7233E+00 |
| A10 = | 1.4358E+02 | 3.6889E+02 | 8.0284E+01 | −3.1247E+00 | −2.3485E+00 |
| A12 = | −1.1430E+02 | −4.2661E+02 | −7.7210E+01 | 2.4610E+00 | 1.7007E+00 |
| A14 = | −8.3588E+00 | 1.6291E+02 | 3.1055E+01 | −9.9628E−01 | −6.5048E−01 |
| A16 = | | | | 1.6291E−01 | 1.0333E−01 |

In the optical image capturing lens assembly according to the 2nd embodiment, the definitions of f, Fno, HFOV, V3, V4, R6, CT3, f1, f2, Y11, Y52, Yc11, Yc52, Dist_max, $\tan\theta_1$, $\tan\theta_2$, and FOV are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 1.37 | \|Yc11/Y11\| | 0.75 |
| Fno | 2.40 | \|Yc52/Y52\| | 0.72 |
| HFOV (deg.) | 47.8 | $\tan\theta_1$ | 0.087 |
| V3 − V4 | 33.0 | $\tan\theta_2$ | 0.198 |
| R6/CT3 | −0.88 | Dist (max) (%) | 1.99 |
| \|f/f1\| + \|f/f2\| | 0.29 | FOV (deg.) | 95.6 |
| \|Y11/Y52\| | | | |

3rd Embodiment

Figure 5:
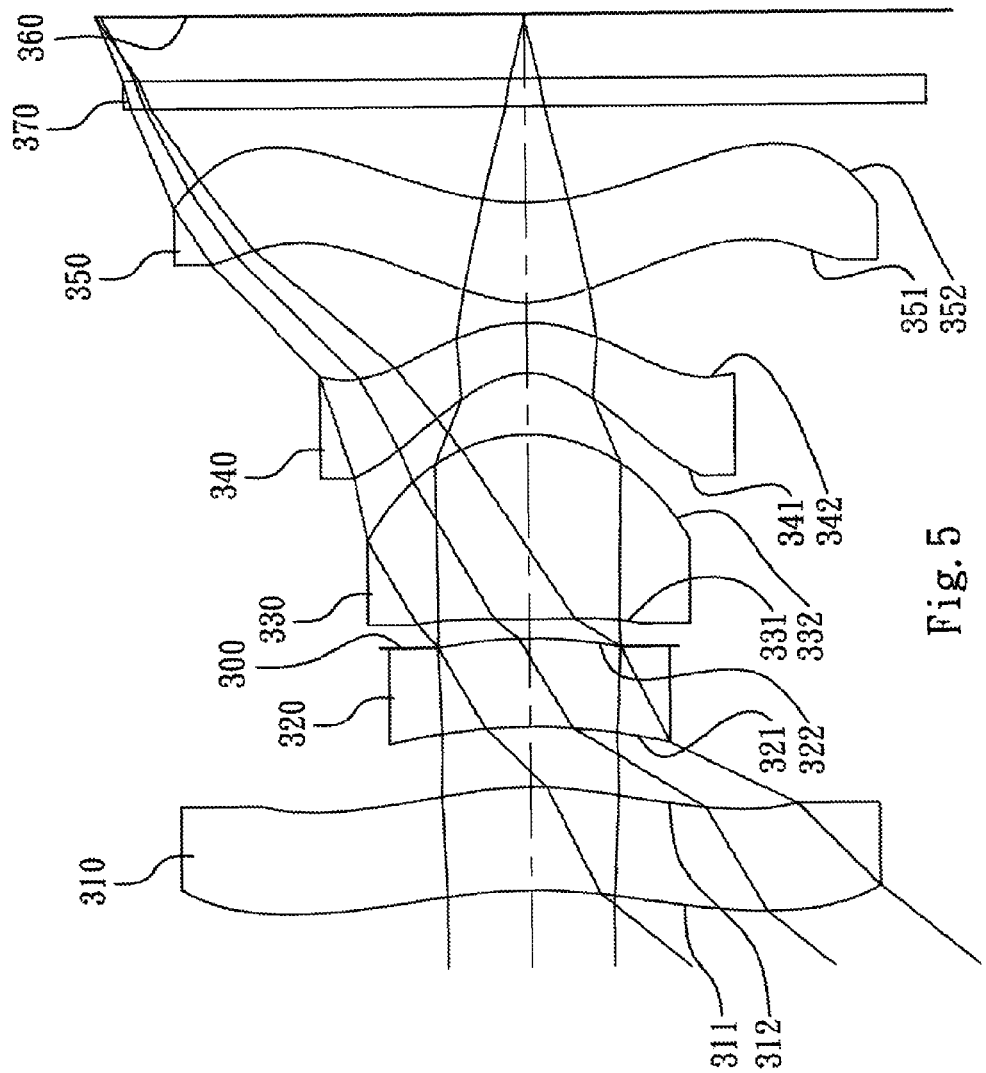
FIG. 5 is a schematic view of an optical image capturing lens assembly according to the 3rd embodiment of the present disclosure.
Figure 6:
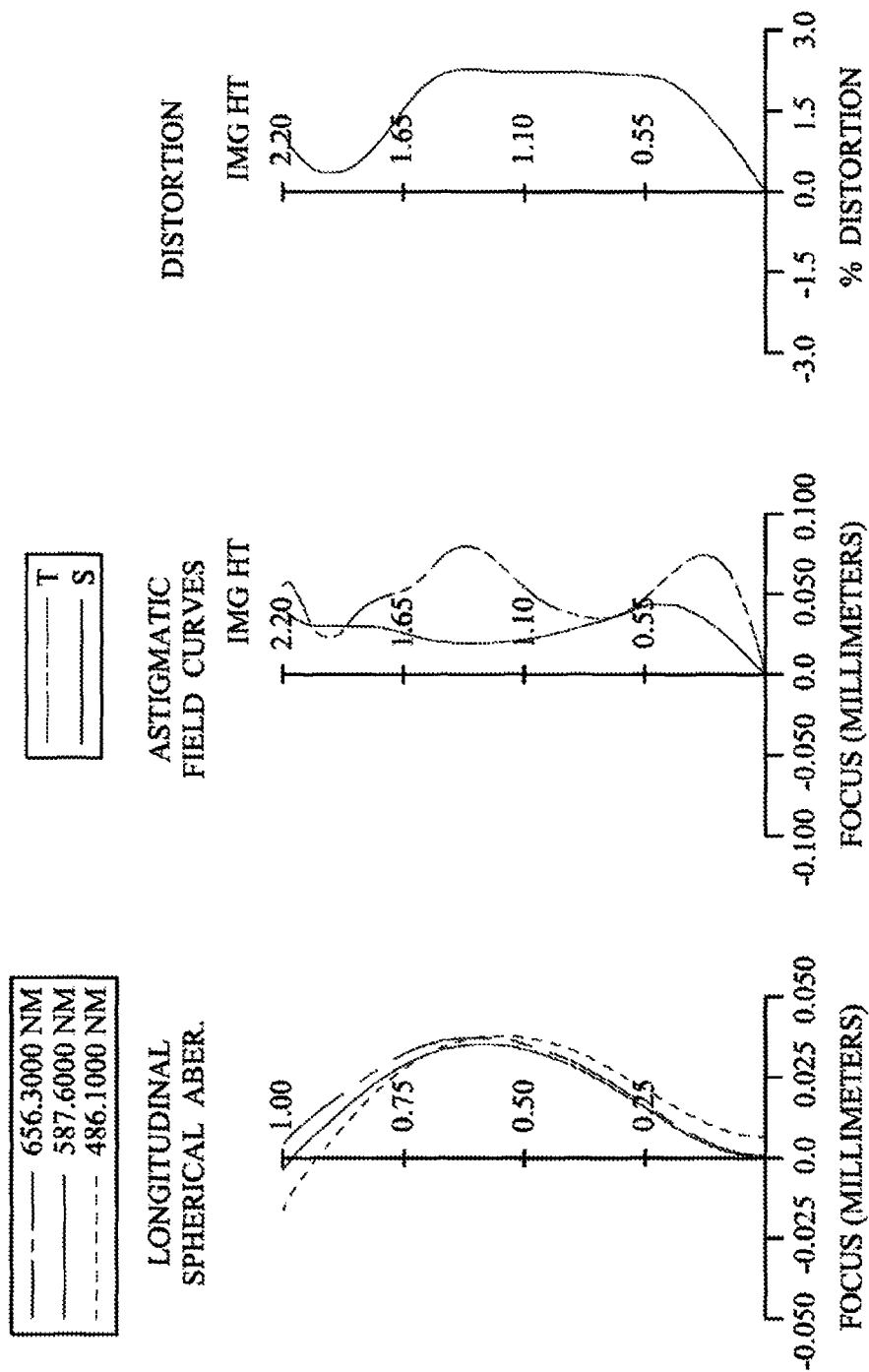
FIG. 6 shows spherical aberration curves, astigmatic field curves and a distortion curve of the optical image capturing lens assembly according to the 3rd embodiment.

FIG. 5 is a schematic view of an optical image capturing lens assembly according to the 3rd embodiment of the present disclosure. FIG. 6 shows spherical aberration curves, astigmatic field curves and a distortion curve of the optical image capturing lens assembly according to the 3rd embodiment. In FIG. 5, the optical image capturing lens assembly includes, in order from an object side to an image side, a first lens element 310, a second lens element 320, an aperture stop 300, a third lens element 330, a fourth lens element 340, a fifth lens element 350, an IR-cut filter 370 and an image plane 360.

The first lens element 310 with positive refractive power has a concave object-side surface 311 at a paraxial region and a convex image-side surface 312 at a paraxial region, wherein the object-side surface 311 of the first lens element 310 changes from concave at the paraxial region to convex at a peripheral region. The first lens element 310 is made of plastic material and has the object-side surface 311 and the image-side surface 312 being aspheric.

The second lens element 320 with positive refractive power has a concave object-side surface 321 and a convex image-side surface 322. The second lens element 320 is made of plastic material and has the object-side surface 321 and the image-side surface 322 being aspheric.

The third lens element 330 with positive refractive power has a convex object-side surface 331 at a paraxial region and a convex image-side surface 332 at a paraxial region. The third lens element 330 is made of plastic material and has the object-side surface 331 and the image-side surface 332 being aspheric.

The fourth lens element 340 with negative refractive power has a concave object-side surface 341 at a paraxial region and a convex image-side surface 342 at a paraxial region. The fourth lens element 340 is made of plastic material and has the object-side surface 341 and the image-side surface 342 being aspheric.

The fifth lens element 350 with positive refractive power has a convex object-side surface 351 at a paraxial region and a concave image-side surface 352 at a paraxial region, wherein the image-side surface 352 of the fifth lens element 350 changes from concave at the paraxial region to convex at a to peripheral region. The fifth lens element 350 is made of plastic material and has the object-side surface 351 and the image-side surface 352 being aspheric.

The IR-cut filter 370 is made of glass material, wherein the IR-cut filter 370 is located between the fifth lens element 350 and the image plane 360, and will not affect the focal length of the optical image capturing lens assembly.

The detailed optical data of the 3rd embodiment are shown in Table 5 and the aspheric surface data are shown in Table 6 below.

TABLE 5

3rd Embodiment
f = 1.74 mm, Fno = 2.00, HFOV = 51.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.339 | ASP | 0.536 | Plastic | 1.544 | 55.9 | 10.30 |
| 2 | | −1.784 | ASP | 0.312 | | | | |
| 3 | Lens 2 | −2.552 | ASP | 0.459 | Plastic | 1.544 | 55.9 | 22.59 |
| 4 | | −2.247 | ASP | −0.045 | | | | |
| 5 | Ape. Stop | Plano | | 0.145 | | | | |
| 6 | Lens 3 | 41.021 | ASP | 0.960 | Plastic | 1.544 | 55.9 | 1.47 |
| 7 | | −0.811 | ASP | 0.322 | | | | |
| 8 | Lens 4 | −0.365 | ASP | 0.257 | Plastic | 1.650 | 21.4 | −1.13 |

TABLE 5-continued

3rd Embodiment
f = 1.74 mm, Fno = 2.00, HFOV = 51.2 deg.

| Surface # | | Curvature Radius | | Thickness | Material | Index | Abbe # | Focal length |
|---|---|---|---|---|---|---|---|---|
| 9 | | −0.927 | ASP | 0.108 | | | | |
| 10 | Lens 5 | 0.609 | ASP | 0.523 | Plastic | 1.544 | 55.9 | 1.63 |
| 11 | | 1.353 | ASP | 0.500 | | | | |
| 12 | IR-cut filter | Plano | | 0.145 | Glass | 1.517 | 64.2 | — |
| 13 | | Plano | | 0.334 | | | | |
| 14 | Image | Plano | | — | | | | |

Reference wavelength (d-line) is 587.6 nm.

TABLE 6

Aspheric Coefficients

| | Surface # | | | | |
|---|---|---|---|---|---|
| | 1 | 2 | 3 | 4 | 6 |
| k = | −1.7867E+01 | −1.4319E+01 | −1.3226E+01 | −2.0000E+01 | −1.0000E+00 |
| A4 = | 4.0420E−02 | 8.9781E−02 | 1.9807E−01 | −1.2426E−01 | −9.2555E−02 |
| A6 = | −7.4473E−03 | −8.3315E−02 | −1.2968E+00 | 1.1205E+00 | 6.4755E−01 |
| A8 = | −1.8380E−04 | 7.6879E−02 | 3.9702E+00 | −8.2112E+00 | −1.1413E+01 |
| A10 = | 1.4708E−03 | −4.2216E−02 | −6.2798E+00 | 1.7385E+01 | 3.9790E+01 |
| A12 = | −5.0119E−04 | 1.2715E−02 | 3.9352E+00 | 3.9568E+00 | −6.6614E+01 |
| A14 = | 6.1430E−05 | −1.4999E−03 | 6.9211E−10 | 1.6595E−09 | 5.6571E+01 |

| | Surface # | | | | |
|---|---|---|---|---|---|
| | 7 | 8 | 9 | 10 | 11 |
| k = | −7.11122E+00 | −2.7786E+00 | −5.4558E−01 | −5.7957E+00 | −7.3014E−01 |
| A4 = | −1.3189E+00 | −1.5732E+00 | −3.9675E−01 | 3.2715E−02 | −1.1791E−01 |
| A6 = | 3.0021E+00 | 6.4761E+00 | 2.4750E+00 | −1.7802E−01 | −9.5384E−02 |
| A8 = | −5.8405E+00 | −1.3283E+01 | −3.7665E+00 | 1.8732E−01 | 1.4286E−01 |
| A10 = | 6.0265E+00 | 1.5179E+01 | 3.2984E+00 | −1.2695E−01 | −9.6041E−02 |
| A12 = | −3.2228E+00 | −8.4341E+00 | −1.5429E+00 | 4.9531E−02 | 3.4245E−02 |
| A14 = | 8.4172E−01 | 1.5699E+00 | 2.9261E−01 | −9.8246E−03 | −6.3834E−03 |
| A16 = | | | | 7.7459E−04 | 4.9120E−04 |

In the optical image capturing lens assembly according to the 3rd embodiment, the definitions of f, Fno, HFOV, V3, V4, R6, CT3, f1, f2, Y11, Y52, Yc11, Yc52, Dist_max, tan θ$_1$, tan θ$_2$, and FOV are the same as those stated in the 1st embodiment with corresponding values for the 3rd embodiment. Moreover, these parameters can be calculated from Table 3 and Table 4 as the following values and satisfy the following relationships:

| f (mm) | 1.74 | |Yc11/Y11| | 0.68 |
|---|---|---|---|
| Fno | 2.00 | |Yc52/Y52| | 0.71 |
| HFOV (deg.) | 51.2 | tanθ$_1$ | 0.096 |
| V3 − V4 | 34.5 | tanθ$_2$ | 0.226 |
| R6/CT3 | −0.85 | Dist (max) (%) | 2.27 |
| |f/f1| + |f/f2| | 0.25 | FOV (deg.) | 102.4 |
| |Y11/Y52| | 0.99 | | |

4th Embodiment

Figure 7:
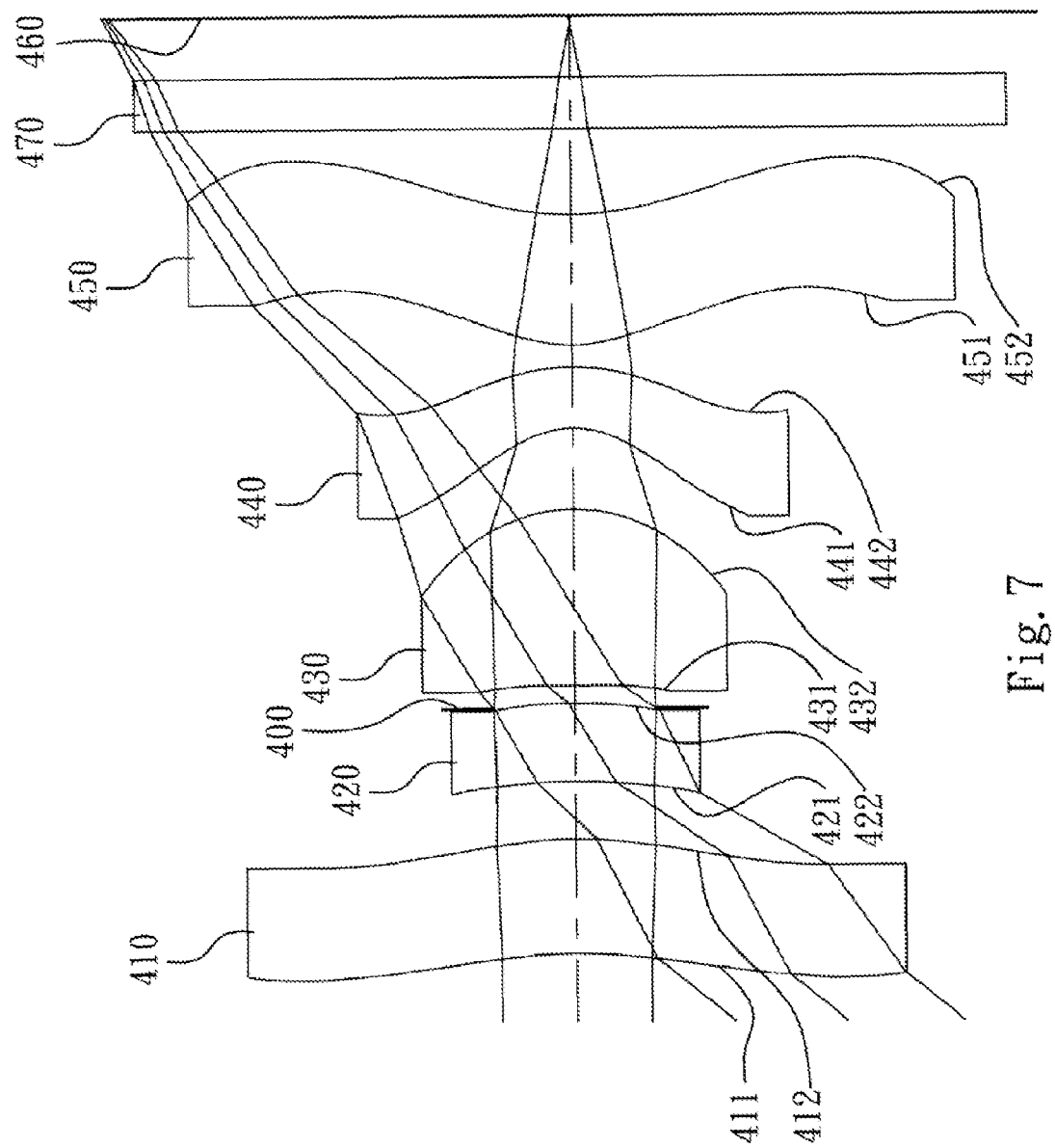
FIG. 7 is a schematic view of an optical image capturing lens assembly according to the 4th embodiment of the present disclosure.
Figure 8:
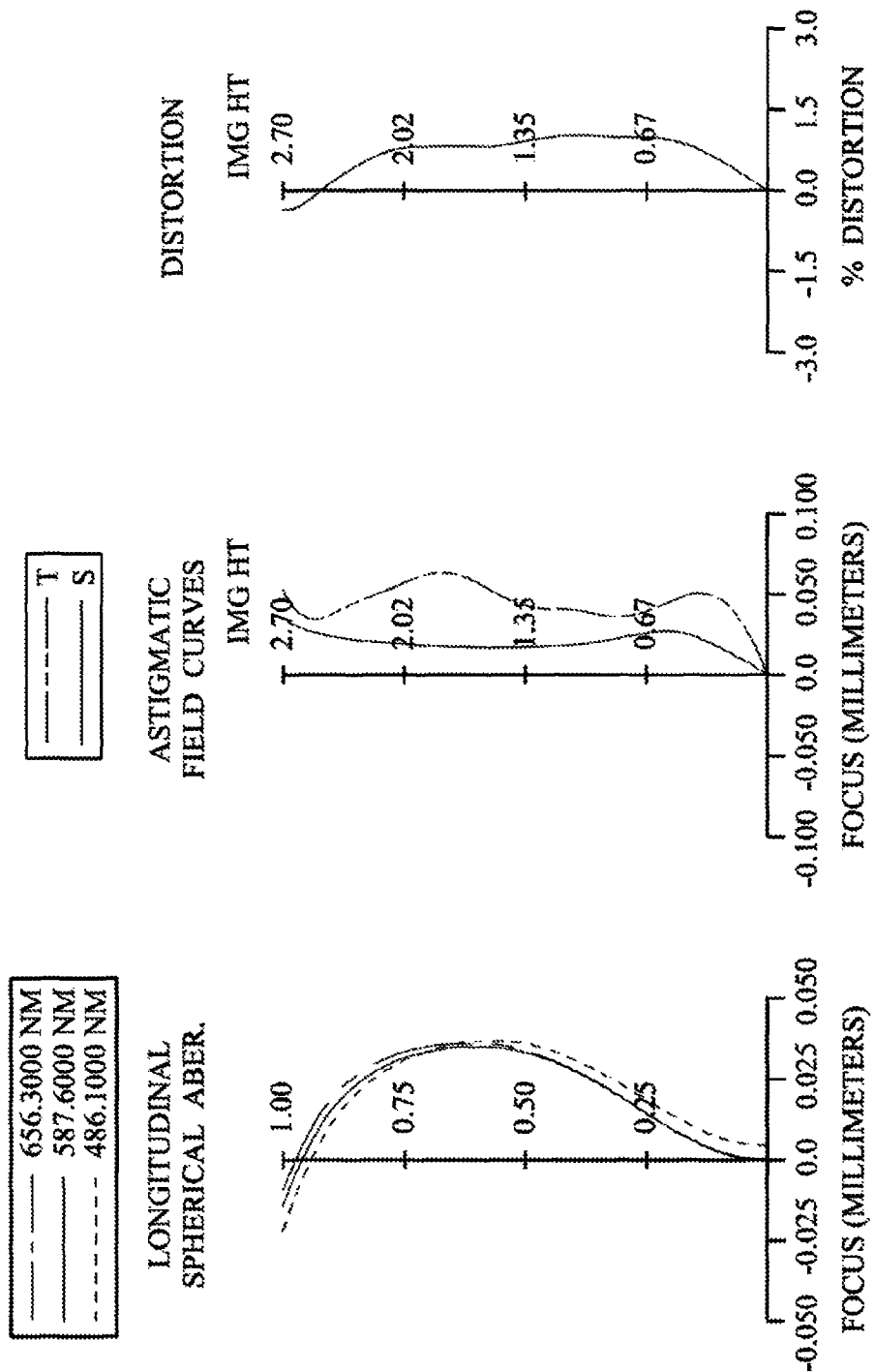
FIG. 8 shows spherical aberration curves, astigmatic field curves and a distortion curve of the optical image capturing lens assembly according to the 4th embodiment.

FIG. 7 is a schematic view of an optical image capturing lens assembly according to the 4th embodiment of the present disclosure. FIG. 8 shows spherical aberration curves, astigmatic field curves and a distortion curve of the optical image capturing lens assembly according to the 4th embodiment. In FIG. 7, the optical image capturing lens assembly includes, in order from an object side to an image side, a first lens element 410, a second lens element 420, an aperture stop 400, a third lens element 430, a fourth lens element 440, a fifth lens element 450, an IR-cut filter 470 and an image plane 460.

The first lens element 410 with positive refractive power has a concave object-side surface 411 at a paraxial region and a convex image-side surface 412 at a paraxial region, wherein the object-side surface 411 of the first lens element 410 changes from concave at the paraxial region to convex at a peripheral region. The first lens element 410 is made of plastic material and has the object-side surface 411 and the image-side surface 412 being aspheric.

The second lens element 420 with positive refractive power has a concave object-side surface 421 and a convex image-side surface 422. The second lens element 420 is made of plastic material and has the object-side surface 421 and the image-side surface 422 being aspheric.

The third lens element 430 with positive refractive power has a concave object-side surface 431 at a paraxial region and a convex image-side surface 432 at a paraxial region. The third lens element 430 is made of glass material and has the object-side surface 431 and the image-side surface 432 being aspheric.

The fourth lens element 440 with negative refractive power has a concave object-side surface 441 at a paraxial region and a convex image-side surface 442 at a paraxial region. The fourth lens element 440 is made of plastic material and has the object-side surface 441 and the image-side surface to 442 being aspheric.

The fifth lens element 450 with positive refractive power has a convex object-side surface 451 at a paraxial region and a concave image-side surface 452 at a paraxial region, wherein the image-side surface 452 of the fifth lens element 450 changes from concave at the paraxial region to convex at a is peripheral region. The fifth lens element 450 is made of plastic material and has the object-side surface 451 and the image-side surface 452 being aspheric.

The IR-cut filter 470 is made of glass material, wherein the IR-cut filter 470 is located between the fifth lens element 450 and the image plane 460, and will not affect the focal length of the optical image capturing lens assembly.

The detailed optical data of the 4th embodiment are shown in Table 7 and the aspheric surface data are shown in Table 8 below.

TABLE 7

4th Embodiment
f = 2.18 mm, Fno = 2.50 HFOV = 51.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.945 | ASP | 0.668 | Plastic | 1.535 | 56.3 | 12.45 |
| 2 | | −2.203 | ASP | 0.334 | | | | |
| 3 | Lens 2 | −3.476 | ASP | 0.452 | Plastic | 1.535 | 56.3 | 92.01 |
| 4 | | −3.394 | ASP | −0.030 | | | | |
| 5 | Ape. Stop | Plano | | 0.134 | | | | |
| 6 | Lens 3 | −25.435 | ASP | 1.029 | Glass | 1.542 | 62.9 | 1.78 |
| 7 | | −0.945 | ASP | 0.473 | | | | |
| 8 | Lens 4 | −0.479 | ASP | 0.354 | Plastic | 1.640 | 23.3 | −1.44 |
| 9 | | −1.290 | ASP | 0.125 | | | | |
| 10 | Lens 5 | 0.807 | ASP | 0.765 | Plastic | 1.544 | 55.9 | 2.13 |
| 11 | | 1.758 | ASP | 0.500 | | | | |
| 12 | IR-cut filter | Plano | | 0.300 | Glass | 1.517 | 64.2 | — |
| 13 | | Plano | | 0.355 | | | | |
| 14 | Image | Plano | | — | | | | |

Reference wavelength (d-line) is 587.6 nm.

TABLE 8

Aspheric Coefficients

| Surface # | | | | | |
|---|---|---|---|---|---|
| | 1 | 2 | 3 | 4 | 6 |
| k = | −1.9346E+01 | −1.7959E+01 | −8.2402E+00 | −1.4997E+01 | −2.0000E+01 |
| A4 = | 2.0600E−02 | 3.1681E−02 | 8.9406E−02 | −1.9049E−01 | −3.2539E−01 |
| A6 = | −3.2645E−03 | −1.7428E−02 | −5.0114E−01 | 9.7634E−02 | 3.6611E−01 |
| A8 = | −2.4002E−05 | 1.0946E−02 | 9.3591E−01 | −9.7587E−01 | −3.7937E+00 |
| A10 = | 2.2012E−04 | −4.7926E−03 | −2.7594E−01 | 3.0646E+00 | 7.5413E+00 |
| A12 = | −3.7549E−05 | 1.3734E−03 | −1.7836E+00 | 2.2421E−01 | 9.1497E+00 |
| A14 = | 2.3479E−06 | −1.5814E−04 | 1.8773E+00 | −3.1281E−08 | −2.4867E+01 |

| Surface # | | | | | |
|---|---|---|---|---|---|
| | 7 | 8 | 9 | 10 | 11 |
| k = | −5.3181E+00 | −2.9058E+00 | −6.8022E−01 | −5.9278E+00 | −4.8272E−01 |
| A4 = | −6.6446E−01 | −5.9685E−01 | −1.5012E−01 | −1.4092E−02 | −7.6360E−02 |
| A6 = | 8.2444E−01 | 1.7556E+00 | 6.7091E−01 | −4.3548E−02 | −2.4091E−02 |
| A8 = | −9.6831E−01 | −2.1898E+00 | −6.1093E−01 | 3.0215E−02 | 2.3179E−02 |
| A10 = | 5.9231E−01 | 1.4623E+00 | 3.1131E−01 | −1.2058E−02 | −9.1572E−03 |
| A12 = | −2.8682E−01 | −4.4871E−01 | −8.8501E−02 | 2.8174E−03 | 1.9273E−03 |
| A14 = | −1.5308E−01 | 2.3250E−02 | 1.0428E−02 | −3.2891E−04 | −2.1646E−04 |
| A16 = | | | | 1.4517E−05 | 9.9903E−06 |

In the optical image capturing lens assembly according to the 4th embodiment, the definitions of f, Fno, HFOV, V3, V4, R6, CT3, f1, f2, Y11, Y52, Yc11, Yc52, Dist_max, $\tan\theta_1$, $\tan\theta_2$, and FOV are the same as those stated in the 1st embodiment with corresponding values for the 4th embodiment. Moreover, these parameters can be calculated from Table 7 and Table 8 as the following values and satisfy the following relationships:

| | | | |
|---|---|---|---|
| f (mm) | 2.18 | |Yc11/Y11| | 0.84 |
| Fno | 2.50 | |Yc52/Y52| | 0.72 |
| HFOV (deg.) | 51.0 | $\tan\theta_1$ | 0.095 |
| V3 − V4 | 39.6 | $\tan\theta_2$ | 0.197 |
| R6/CT3 | −0.92 | Dist (max) (%) | 1.01 |
| |f/f1| + |f/f2| | 0.20 | FOV (deg.) | 102.0 |
| |Y11/Y52| | 0.86 | | |

5th Embodiment

Figure 9:
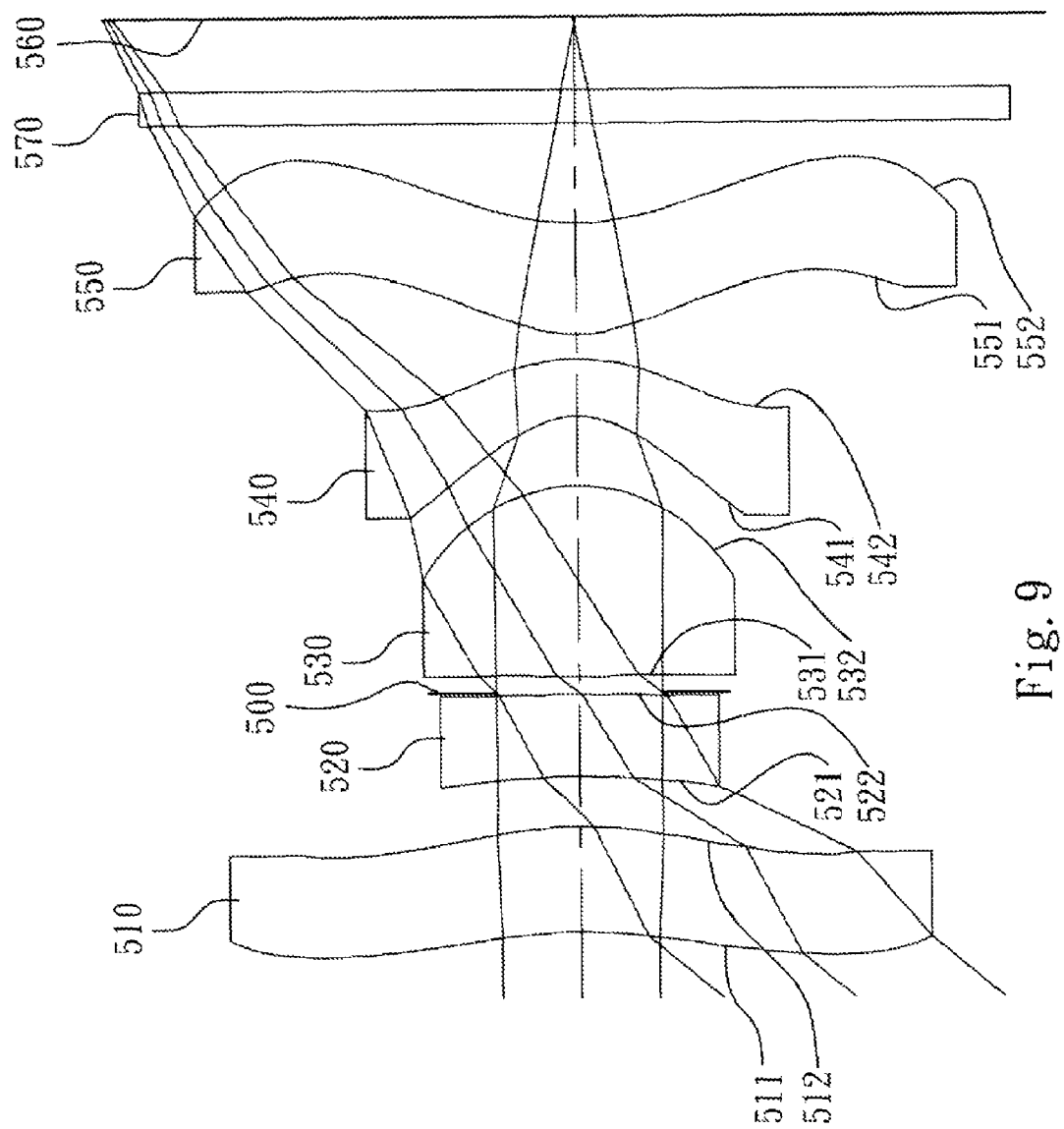
FIG. 9 is a schematic view of an optical image capturing lens assembly according to the 5th embodiment of the present disclosure.
Figure 10:
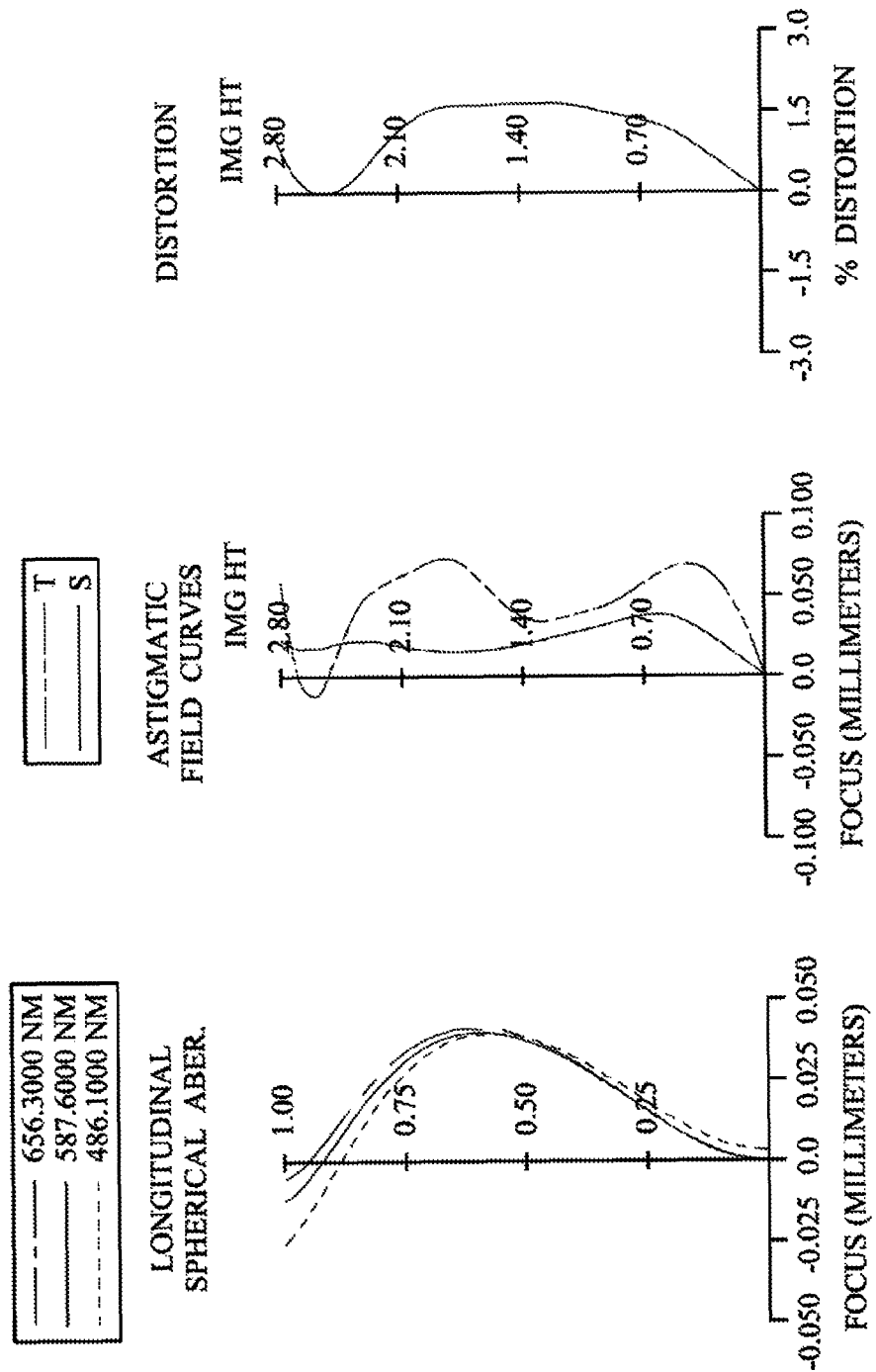
FIG. 10 shows spherical aberration curves, astigmatic field curves and a distortion curve of the optical image capturing lens assembly according to the 5th embodiment.

FIG. 9 is a schematic view of an optical image capturing lens assembly according to the 5th embodiment of the present disclosure. FIG. 10 shows spherical aberration curves, astigmatic field curves and a distortion curve of the optical image capturing lens assembly according to the 5th embodiment. In FIG. 9, the optical image capturing lens assembly includes, in order from an object side to an image side, a first lens element 510, a second lens element 520, an aperture stop 500, a third lens element 530, a fourth lens element 540, a fifth lens element 550, an IR-cut filter 570 and an image plane 560.

The first lens element 510 with positive refractive power has a concave object-side surface 511 at a paraxial region and a convex image-side surface 512 at a paraxial region, wherein the object-side surface 511 of the first lens element 510 changes from concave at the paraxial region to convex at a peripheral region. The first lens element 510 is made of plastic material and has the object-side surface 511 and the image-side surface 512 being aspheric.

The second lens element 520 with negative refractive power has a concave object-side surface 521 and a concave image-side surface 522. The second lens element 520 is made of plastic material and has the object-side surface 521 and the image-side surface 522 being aspheric.

The third lens element 530 with positive refractive power has a convex object-side surface 531 at a paraxial region and a convex image-side surface 532 at a paraxial region. The third lens element 530 is made of plastic material and has the object-side surface 531 and the image-side surface 532 being aspheric.

The fourth lens element 540 with negative refractive power has a concave object-side surface 541 at a paraxial region and a convex image-side surface 542 at a paraxial region. The fourth lens element 540 is made of plastic material and has the object-side surface 541 and the image-side surface 542 being aspheric.

The fifth lens element 550 with positive refractive power has a convex object-side surface 551 at a paraxial region and a concave image-side surface 552 at a paraxial region, wherein the image-side surface 552 of the fifth lens element 550 changes from concave at the paraxial region to convex at a peripheral region. The fifth lens element 550 is made of plastic material and has the object-side surface 551 and the image-side surface 552 being aspheric.

The IR-cut filter 570 is made of glass material, wherein the IR-cut filter 570 is located between the fifth lens element 550 and the image plane 560, and will not affect the focal length of the optical image capturing lens assembly.

The detailed optical data of the 5th embodiment are shown in Table 9 and the aspheric surface data are shown in Table 10 below.

TABLE 9

5th Embodiment
f = 2.31 mm, Fno = 2.45, HFOV = 50.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.970 | ASP | 0.633 | Plastic | 1.544 | 55.9 | 10.58 |
| 2 | | −2.106 | ASP | 0.301 | | | | |
| 3 | Lens 2 | −5.135 | ASP | 0.489 | Plastic | 1.544 | 55.9 | −7.99 |
| 4 | | 29.371 | ASP | 0.013 | | | | |
| 5 | Ape. Stop | Plano | | 0.096 | | | | |
| 6 | Lens 3 | 4.211 | ASP | 1.149 | Plastic | 1.544 | 55.9 | 1.57 |
| 7 | | −0.970 | ASP | 0.418 | | | | |
| 8 | Lens 4 | −0.485 | ASP | 0.340 | Plastic | 1.640 | 23.3 | −1.39 |
| 9 | | −1.354 | ASP | 0.149 | | | | |
| 10 | Lens 5 | 0.774 | ASP | 0.673 | Plastic | 1.535 | 56.3 | 2.20 |
| 11 | | 1.570 | ASP | 0.600 | | | | |
| 12 | IR-cut filter | Plano | | 0.200 | Glass | 1.517 | 64.2 | — |
| 13 | | Plano | | 0.436 | | | | |
| 14 | Image | Plano | | — | | | | |

Reference wavelength (d-line) is 587.6 nm.

TABLE 10

Aspheric Coefficients

| | Surface # | | | | |
|---|---|---|---|---|---|
| | 1 | 2 | 3 | 4 | 6 |
| k = | −1.9294E+01 | −1.5387E+01 | −1.7636E+01 | −1.0000E+00 | −5.0421E+00 |
| A4 = | 2.1438E−02 | 3.5915E−02 | 8.5944E−02 | −2.2305E−01 | −2.7007E−01 |

TABLE 10-continued

Aspheric Coefficients

| | | | | | |
|---|---|---|---|---|---|
| A6 = | −2.9635E−03 | −2.2578E−02 | −4.9245E−01 | 4.1277E−01 | 2.4827E−01 |
| A8 = | −7.6373E−05 | 1.4423E−02 | 1.3001E+00 | −1.0684E+00 | −1.8226E+00 |
| A10 = | 2.5028E−04 | −5.7353E−03 | −1.9528E+00 | −3.3364E−02 | 4.2753E+00 |
| A12 = | −4.8880E−05 | 1.3479E−03 | 1.5470E+00 | 5.7664E+00 | −4.4923E+00 |
| A14 = | 3.7325E−06 | −1.2940E−04 | −4.9090E−01 | 1.0994E−09 | 2.6374E+00 |

| | Surface # | | | | |
|---|---|---|---|---|---|
| | 7 | 8 | 9 | 10 | 11 |
| k = | −6.8061E+00 | −3.0504E+00 | −5.3839E−01 | −5.5305E+00 | −6.9925E−01 |
| A4 = | −7.1823E−01 | −7.5406E−01 | −2.0101E−01 | −2.6492E−03 | −7.9552E−02 |
| A6 = | 9.9708E−01 | 1.9242E+00 | 7.4025E−01 | −4.8199E−02 | −2.4962E−02 |
| A8 = | −1.1837E+00 | −2.4653E+00 | −7.0063E−01 | 3.4488E−02 | 2.6380E−02 |
| A10 = | 6.5122E−01 | 1.7253E+00 | 3.7339E−01 | −1.4523E−02 | −1.0970E−02 |
| A12 = | −1.5998E−01 | −5.9844E−01 | −1.0920E−01 | 3.4848E−03 | 2.4030E−03 |
| A14 = | 1.3063E−02 | 6.9185E−02 | 1.3533E−02 | −4.2671E−04 | −2.7839E−04 |
| A16 = | | | | 2.0868E−05 | 1.3439E−05 |

In the optical image capturing lens assembly according to the 5th embodiment, the definitions of f, Fno, HFOV, V3, V4, R6, CT3, f1, f2, Y11, Y52, Yc11, Yc52, Dist_max, $\tan\theta_1$, $\tan\theta_2$, and FOV are the same as those stated in the 1st embodiment with corresponding values for the 5th embodiment. Moreover, these parameters can be calculated from Table 9 and Table 10 as the following values and satisfy the following relationships:

| | | | |
|---|---|---|---|
| f (mm) | 2.31 | |Yc11/Y11| | 0.73 |
| Fno | 2.45 | |Yc52/Y52| | 0.72 |
| HFOV (deg.) | 50.0 | $\tan\theta_1$ | 0.093 |
| V3 − V4 | 32.6 | $\tan\theta_2$ | 0.230 |
| R6/CT3 | −0.84 | Dist (max) (%) | 1.65 |
| |f/f1| + |f/f2| | 0.51 | FOV (deg.) | 100.0 |
| |Y11/Y52| | 0.92 | | |

6th Embodiment

Figure 11:
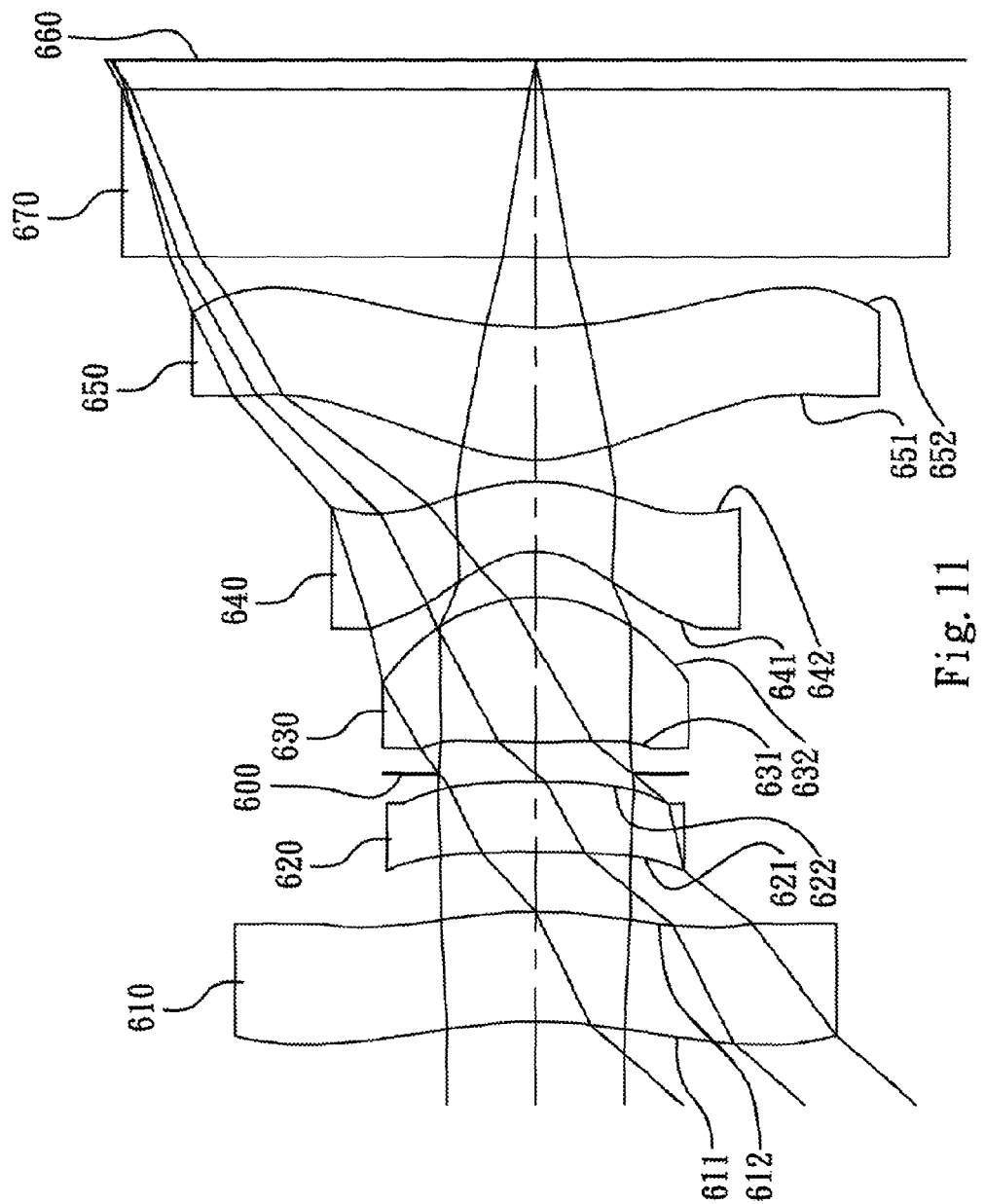
FIG. 11 is a schematic view of an optical image capturing lens assembly according to the 6th embodiment of the present disclosure.
Figure 12:
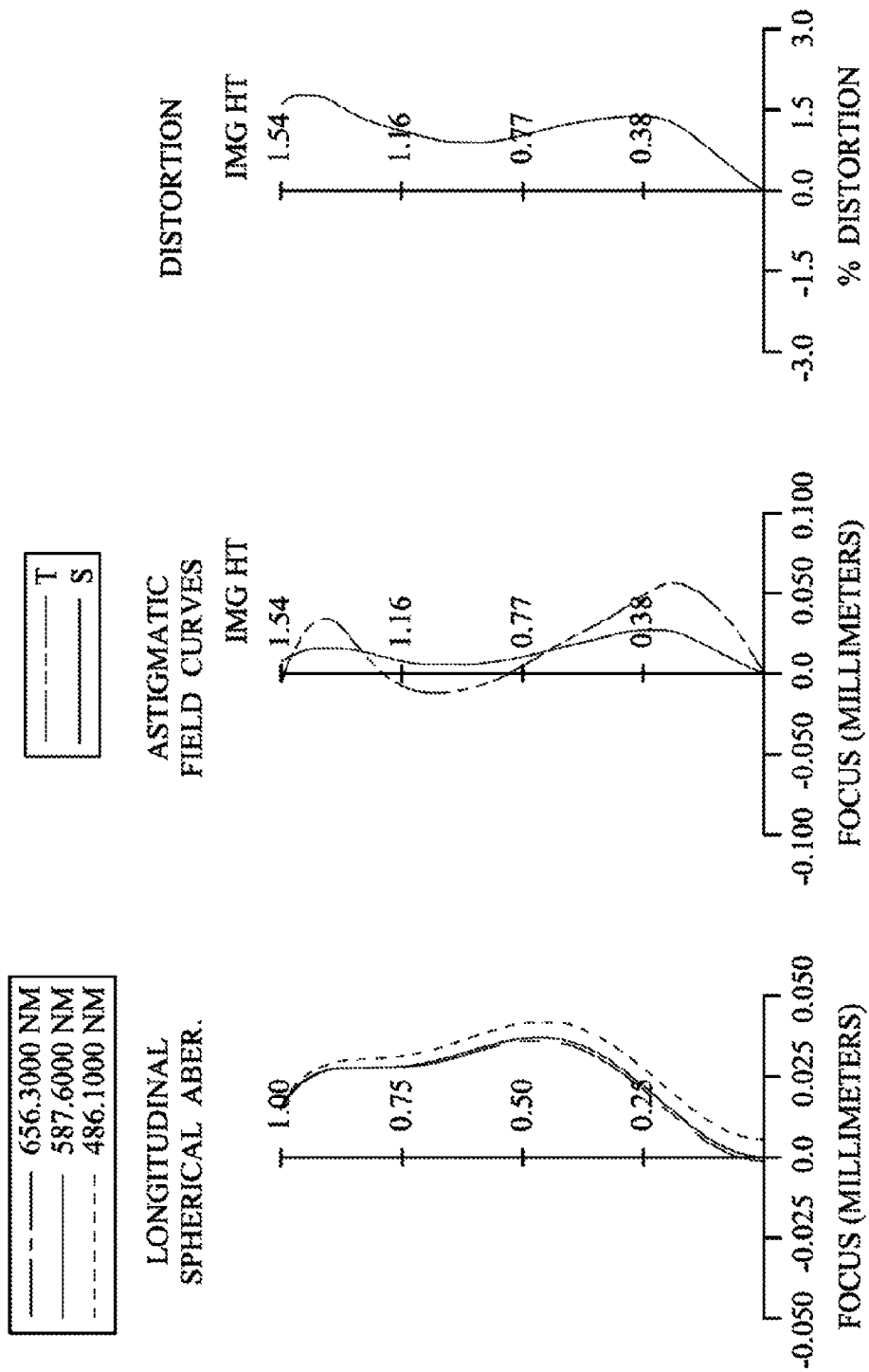
FIG. 12 shows spherical aberration curves, astigmatic field curves and a distortion curve of the optical image capturing lens assembly according to the 6th embodiment.

FIG. 11 is a schematic view of an optical image capturing lens assembly to according to the 6th embodiment of the present disclosure. FIG. 12 shows spherical aberration curves, astigmatic field curves and a distortion curve of the optical image capturing lens assembly according to the 6th embodiment. In FIG. 11, the optical image capturing lens assembly includes, in order from an object side to an image side, a first lens element 610, a second lens element 620, an aperture stop 600, a third lens element 630, a fourth lens element 640, a fifth lens element 650, an IR-cut filter 670 and an image plane 660.

The first lens element 610 with positive refractive power has a concave object-side surface 611 at a paraxial region and a convex image-side surface 612 at a paraxial region, wherein the object-side surface 611 of the first lens element 610 changes from concave at the paraxial region to convex at a peripheral region. The first lens element 610 is made of plastic material and has the object-side surface 611 and the image-side surface 612 being aspheric.

The second lens element 620 with positive refractive power has a concave object-side surface 621 and a convex image-side surface 622. The second lens element 620 is made of plastic material and has the object-side surface 621 and the image-side surface 622 being aspheric.

The third lens element 630 with positive refractive power has a convex object-side surface 631 at a paraxial region and a convex image-side surface 632 at a paraxial region. The third lens element 630 is made of plastic material and has the object-side surface 631 and the image-side surface 632 being aspheric.

The fourth lens element 640 with negative refractive power has a concave object-side surface 641 at a paraxial region and a convex image-side surface 642 at a paraxial region. The fourth lens element 640 is made of plastic material and has the object-side surface 641 and the image-side surface 642 being aspheric.

The fifth lens element 650 with positive refractive power has a convex object-side surface 651 at a paraxial region and a concave image-side surface 652 at a paraxial region, wherein the image-side surface 652 of the fifth lens element 650 changes from concave at the paraxial region to convex at a peripheral region. The fifth lens element 650 is made of plastic material and has the object-side surface 651 and the image-side surface 652 being aspheric.

The IR-cut filter 670 is made of glass material, wherein the IR-cut filter 670 is located between the fifth lens element 650 and the image plane 660, and will not affect the focal length of the optical image capturing lens assembly.

The detailed optical data of the 6th embodiment are shown in Table 11 and the aspheric surface data are shown in Table 12 below.

TABLE 11

6th Embodiment
f = 1.31 mm, Fno = 2.05, HFOV = 49.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −1.568 | ASP | 0.395 | Plastic | 1.544 | 55.9 | 12.75 |
| 2 | | −1.392 | ASP | 0.213 | | | | |
| 3 | Lens 2 | −5.470 | ASP | 0.250 | Plastic | 1.544 | 55.9 | 670.29 |

TABLE 11-continued

6th Embodiment
f = 1.31 mm, Fno = 2.05, HFOV = 49.0 deg.

| Surface # | | Curvature Radius | | Thickness | Material | Index | Abbe # | Focal length |
|---|---|---|---|---|---|---|---|---|
| 4 | | −5.476 | ASP | 0.030 | | | | |
| 5 | Ape. Stop | Plano | | 0.113 | | | | |
| 6 | Lens 3 | 2.526 | ASP | 0.521 | Plastic | 1.544 | 55.9 | 0.95 |
| 7 | | −0.605 | ASP | 0.163 | | | | |
| 8 | Lens 4 | −0.286 | ASP | 0.250 | Plastic | 1.634 | 23.8 | −0.83 |
| 9 | | −0.844 | ASP | 0.078 | | | | |
| 10 | Lens 5 | 0.553 | ASP | 0.478 | Plastic | 1.544 | 55.9 | 1.30 |
| 11 | | 1.750 | ASP | 0.250 | | | | |
| 12 | IR-cut filter | Plano | | 0.600 | Glass | 1.517 | 64.2 | — |
| 13 | | Plano | | 0.106 | | | | |
| 14 | Image | Plano | | — | | | | |

Reference wavelength (d-line) is 587.6 nm.

TABLE 12

Aspheric Coefficients

| | Surface # | | | | |
|---|---|---|---|---|---|
| | 1 | 2 | 3 | 4 | 6 |
| k = | −1.3489E+01 | −1.7886E+01 | 7.6996E+01 | 3.1624E+01 | −5.9203E+00 |
| A4 = | 1.6382E−01 | 2.6955E−01 | 2.8909E−01 | −1.2832E+00 | −1.6106E+00 |
| A6 = | −8.0097E−02 | −2.6186E−01 | −8.0713E+00 | −1.7303E+00 | 4.4506E+00 |
| A8 = | 8.7017E−03 | 6.1572E−01 | 4.7701E+01 | 2.9696E+01 | −1.1180E+02 |
| A10 = | 5.2961E−02 | −1.1355E+00 | −1.5193E+02 | −1.2482E+02 | 8.5636E+02 |
| A12 = | −3.9369E−02 | 1.4759E+00 | 1.8703E+02 | 1.9727E+02 | −3.3211E+03 |
| A14 = | 9.5864E−03 | −7.5372E−01 | | | 5.7411E+03 |

| | Surface # | | | | |
|---|---|---|---|---|---|
| | 7 | 8 | 9 | 10 | 11 |
| k = | −9.9119E+00 | −2.7441E+00 | −6.2560E−01 | −7.5832E+00 | 1.3795E−01 |
| A4 = | −4.6857E+00 | −3.8584E+00 | −1.0027E+00 | 1.8899E−01 | 7.2740E−03 |
| A6 = | 2.1824E+01 | 3.9942E+01 | 1.4380E+01 | −9.8900E−01 | −8.0898E−01 |
| A8 = | −6.9736E+01 | −1.6353E+02 | −4.5886E+01 | 2.1991E+00 | 1.8082E+00 |
| A10 = | 1.2166E+02 | 3.6551E+02 | 8.0064E+01 | −3.1333E+00 | −2.3341E+00 |
| A12 = | −1.1061E+02 | −4.2451E+02 | −7.7300E+01 | 2.4817E+00 | 1.6927E+00 |
| A14 = | | 1.7235E+02 | 3.1662E+01 | −9.7947E−01 | −6.4926E−01 |
| A16 = | | | | 1.5142E−01 | 1.0288E−01 |

In the optical image capturing lens assembly according to the 6th embodiment, the definitions of f, Fno, HFOV, V3, V4, R6, CT3, f1, f2, Y11, Y52, Yc11, Yc52, Dist_max, tan $\theta_1$, tan $\theta_2$, and FOV are the same as those stated in the 1st embodiment with corresponding values for the 6th embodiment. Moreover, these parameters can be calculated from Table 11 and Table 12 as the following values and satisfy the following relationships:

| f (mm) | 1.31 | |Yc11/Y11| | 0.77 |
|---|---|---|---|
| Fno | 2.05 | |Yc52/Y52| | 0.76 |
| HFOV (deg.) | 49.0 | tan$\theta_1$ | 0.100 |
| V3 − V4 | 32.1 | tan$\theta_2$ | 0.151 |
| R6/CT3 | −1.16 | Dist (max) (%) | 1.68 |
| |f/f1| + |f/f2| | 0.10 | FOV (deg.) | 98.0 |
| |Y11/Y52| | 0.88 | | |

7th Embodiment

Figure 13:
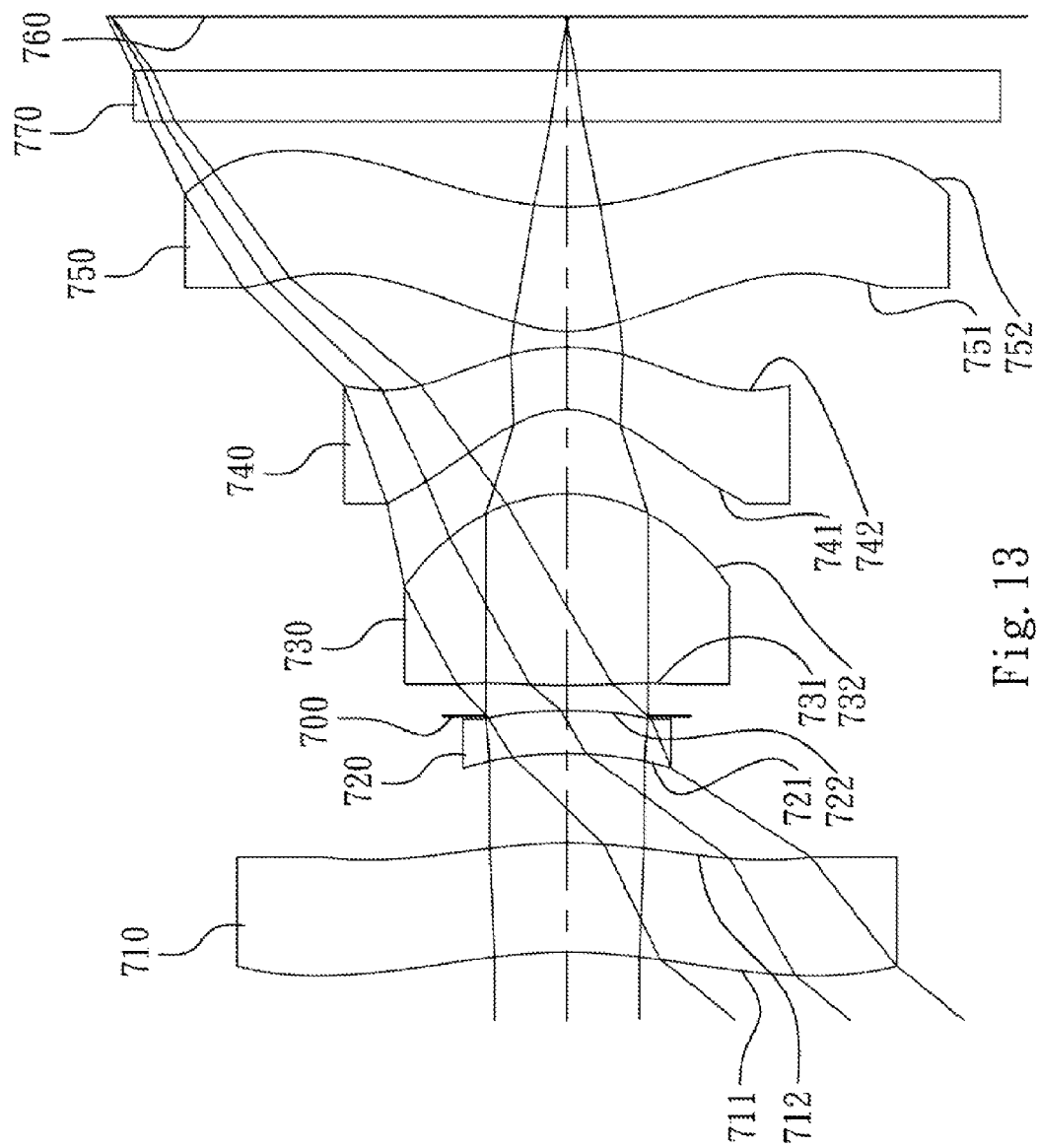
FIG. 13 is a schematic view of an optical image capturing lens assembly according to the 7th embodiment of the present disclosure.
Figure 14:
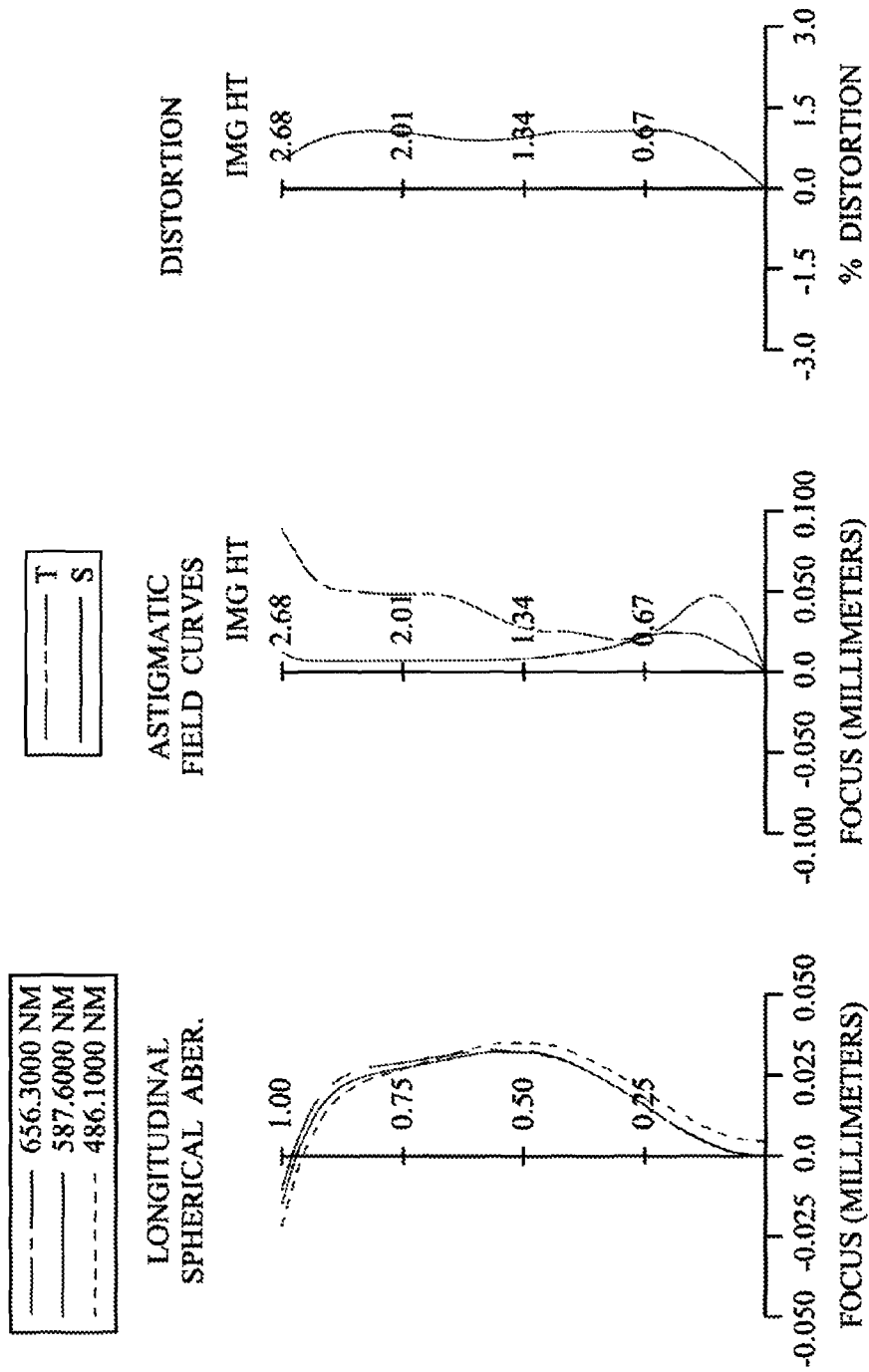
FIG. 14 shows spherical aberration curves, astigmatic field curves and a distortion curve of the optical image capturing lens assembly according to the 7th embodiment.

FIG. 13 is a schematic view of an optical image capturing lens assembly according to the 7th embodiment of the present disclosure. FIG. 14 shows spherical aberration curves, astigmatic field curves and a distortion curve of the optical image capturing lens assembly according to the 7th embodiment. In FIG. 13, the optical image capturing lens assembly includes, in order from an object side to an image side, a first lens element 710, a second lens element 720, an aperture stop 700, a third lens element 730, a fourth lens element 740, a fifth lens element 750, an IR-cut filter 770 and an image plane 760.

The first lens element 710 with positive refractive power has a concave object-side surface 711 at a paraxial region and a convex image-side surface 712 at a paraxial region, wherein the object-side surface 711 of the first lens to element 710 changes from concave at the paraxial region to convex at a peripheral region. The first lens element 710 is made of plastic material and has the object-side surface 711 and the image-side surface 712 being aspheric.

The second lens element 720 with negative refractive power has a concave object-side surface 721 and a convex image-side surface 722. The second lens element 720 is made of plastic material and has the object-side surface 721 and the image-side surface 722 being aspheric.

The third lens element 730 with positive refractive power has a convex object-side surface 731 at a paraxial region and a convex image-side surface 732 at a paraxial region. The third lens element 730 is made of glass material and has the object-side surface 731 and the image-side surface 732 being aspheric.

The fourth lens element 740 with negative refractive power has a concave object-side surface 741 at a paraxial region and a convex image-side surface 742 at a paraxial region. The fourth lens element 740 is made of plastic material and has the object-side surface 741 and the image-side surface 742 being aspheric.

The fifth lens element 750 with positive refractive power has a convex object-side surface 751 at a paraxial region and a concave image-side surface 752 at a paraxial region, wherein the image-side surface 752 of the fifth lens element 750 changes from concave at the paraxial region to convex at a peripheral region. The fifth lens element 750 is made of plastic material and has the object-side surface 751 and the image-side surface 752 being aspheric.

The IR-cut filter 770 is made of glass material, wherein the IR-cut filter to 770 is located between the fifth lens element 750 and the image plane 760, and will not affect the focal length of the optical image capturing lens assembly.

The detailed optical data of the 7th embodiment are shown in Table 13 and the aspheric surface data are shown in Table 14 below.

TABLE 13

7th Embodiment
f = 2.13 mm, Fno = 2.50, HFOV = 51.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.761 | ASP | 0.642 | Plastic | 1.535 | 56.3 | 56.39 |
| 2 | | −2.735 | ASP | 0.525 | | | | |
| 3 | Lens 2 | −2.569 | ASP | 0.252 | Plastic | 1.535 | 56.3 | −15.47 |
| 4 | | −3.855 | ASP | −0.029 | | | | |
| 5 | Ape. Stop | Plano | | 0.175 | | | | |
| 6 | Lens 3 | 3.654 | ASP | 1.129 | Glass | 1.542 | 62.9 | 1.60 |
| 7 | | −1.012 | ASP | 0.497 | | | | |
| 8 | Lens 4 | −0.471 | ASP | 0.362 | Plastic | 1.640 | 23.3 | −1.35 |
| 9 | | −1.343 | ASP | 0.095 | | | | |
| 10 | Lens 5 | 0.768 | ASP | 0.736 | Plastic | 1.544 | 55.9 | 1.99 |
| 11 | | 1.739 | ASP | 0.500 | | | | |
| 12 | IR-cut filter | Plano | | 0.300 | Glass | 1.517 | 64.2 | — |
| 13 | | Plano | | 0.313 | | | | |
| 14 | Image | Plano | | — | | | | |

Reference wavelength (d-line) is 587.6 nm.

TABLE 14

Aspheric Coefficients

| | Surface # | | | | |
|---|---|---|---|---|---|
| | 1 | 2 | 3 | 4 | 6 |
| k = | −1.6329E+01 | −1.9966E+01 | 3.0000E+00 | 4.9978E+00 | −2.2810E+00 |
| A4 = | 2.5177E−02 | 4.4876E−02 | −7.3885E−02 | −3.5940E−01 | −4.0700E−01 |
| A6 = | −2.9000E−03 | −1.8000E−02 | −1.8540E−01 | 1.2342E−01 | 6.4067E−01 |
| A8 = | −5.9233E−05 | 1.1067E−02 | 1.4276E+00 | 2.1539E+00 | −2.1794E+00 |
| A10 = | 2.0630E−04 | −4.7106E−03 | −4.3439E+00 | −4.2357E+00 | 2.9501E+00 |
| A12 = | −3.9178E−05 | 1.3516E−03 | 8.5483E+00 | 2.2421E−01 | 3.9027E+00 |
| A14 = | 2.7636E−06 | −1.6795E−04 | −7.7488E+00 | −3.1319E−08 | −7.9339E+00 |

| | Surface # | | | | |
|---|---|---|---|---|---|
| | 7 | 8 | 9 | 10 | 11 |
| k = | −5.7057E+00 | −3.0635E+00 | −6.8194E−01 | −5.9412E+00 | −4.9205E−01 |
| A4 = | −5.9707E−01 | −6.1050E−01 | −1.4256E−01 | −8.5025E−03 | −7.4592E−02 |
| A6 = | 7.5347E−01 | 1.7459E+00 | 6.6792E−01 | −4.5501E−02 | −2.5093E−02 |
| A8 = | −9.3019E−01 | −2.1930E+00 | −6.1363E−01 | 3.0216E−02 | 2.3219E−02 |
| A10 = | 6.9246E−01 | 1.4619E+00 | 3.1062E−01 | −1.2020E−02 | −9.1454E−03 |
| A12 = | −3.6312E−01 | −4.5017E−01 | −8.8358E−02 | 2.8239E−03 | 1.9288E−03 |
| A14 = | 1.2553E−01 | 2.8297E−02 | 1.0791E−02 | −3.2853E−04 | −2.1655E−04 |
| A16 = | | | | 1.4129E−05 | 9.9178E−06 |

In the optical image capturing lens assembly according to the 7th embodiment, the definitions of f, Fno, HFOV, V3, V4, R6, CT3, f1, f2, Y11, Y52, Yc11, Yc52, Dist_max, $\tan\theta_1$, $\tan\theta_2$, and FOV are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 2.13 | |Yc11/Y11| | 0.76 |
| Fno | 2.50 | |Yc52/Y52| | 0.72 |
| HFOV (deg.) | 51.2 | $\tan\theta_1$ | 0.098 |
| V3 − V4 | 39.6 | $\tan\theta_2$ | 0.202 |
| R6/CT3 | −0.90 | Dist (max) (%) | 1.06 |
| |f/f1| + |f/f2| | 0.18 | FOV (deg.) | 102.4 |
| |Y11/Y52| | 0.86 | | |

8th Embodiment

Figure 15:
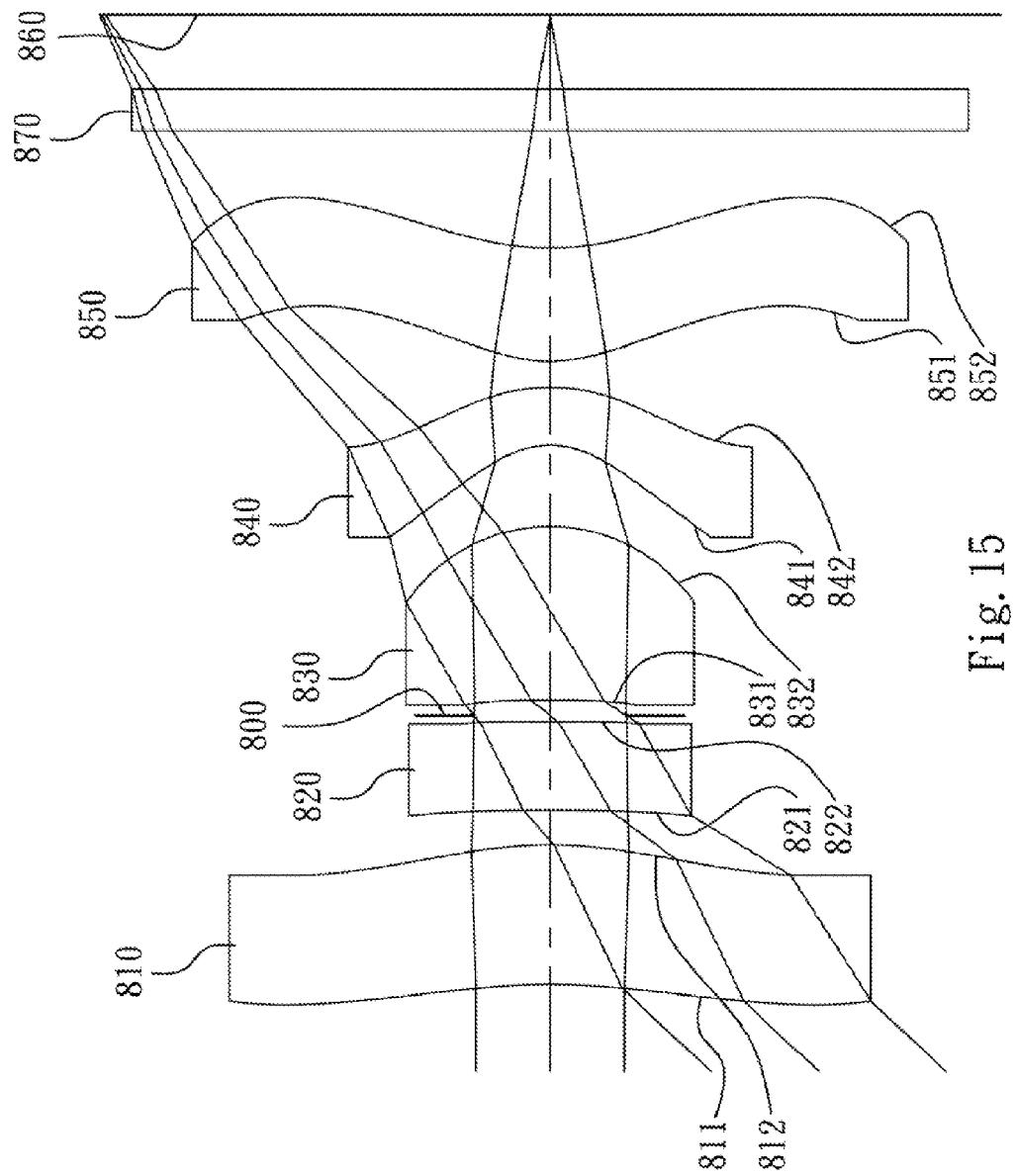
FIG. 15 is a schematic view of an optical image capturing lens assembly according to the 8th embodiment of the present disclosure.
Figure 16:
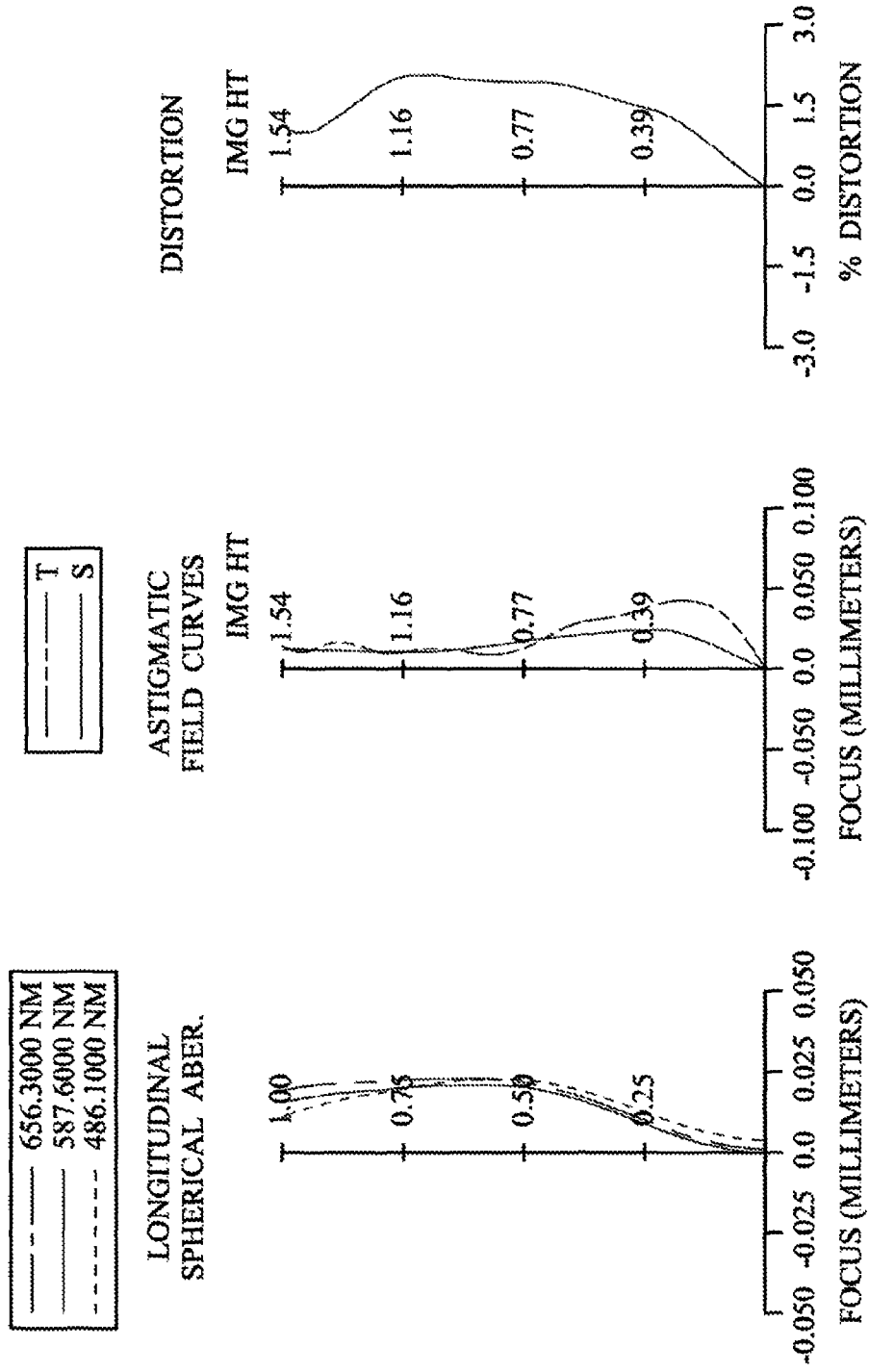
FIG. 16 shows spherical aberration curves, astigmatic field curves and a distortion curve of the optical image capturing lens assembly according to the 8th embodiment.

FIG. 15 is a schematic view of an optical image capturing lens assembly according to the 8th embodiment of the present disclosure. FIG. 16 shows spherical aberration curves, astigmatic field curves and a distortion curve of the optical image capturing lens assembly according to the 8th embodiment. In FIG. 15, the optical image capturing lens assembly includes, in order from an object side to an image side, a first lens element 810, a second lens element 820, an aperture stop 800, a third lens element 830, a fourth lens element 840, a fifth lens element 850, an IR-cut filter 870 and an image plane 860.

The first lens element 810 with positive refractive power has a concave object-side surface 811 at a paraxial region and a convex image-side surface 812 at a paraxial region, wherein the object-side surface 811 of the first lens element 810 changes from concave at the paraxial region to convex at a peripheral region. The first lens element 810 is made of plastic material and has the object-side surface 811 and the image-side surface 812 being aspheric.

The second lens element 820 with negative refractive power has a concave object-side surface 821 and a concave image-side surface 822. The second lens element 820 is made of plastic material and has the object-side surface 821 and the image-side surface 822 being aspheric.

The third lens element 830 with positive refractive power has a concave object-side surface 831 at a paraxial region and a convex image-side surface 832 at a paraxial region. The third lens element 830 is made of plastic material and has the object-side surface 831 and the image-side surface 832 being aspheric.

The fourth lens element 840 with negative refractive power has a concave object-side surface 841 at a paraxial region and a convex image-side surface 842 at a paraxial region. The fourth lens element 840 is made of plastic material and has the object-side surface 841 and the image-side surface 842 being aspheric.

The fifth lens element 850 with positive refractive power has a convex object-side surface 851 at a paraxial region and a concave image-side surface to 852 at a paraxial region, wherein the image-side surface 852 of the fifth lens element 850 changes from concave at the paraxial region to convex at a peripheral region. The fifth lens element 850 is made of plastic material and has the object-side surface 851 and the image-side surface 852 being aspheric.

The IR-cut filter 870 is made of glass material, wherein the IR-cut filter 870 is located between the fifth lens element 850 and the image plane 860, and will not affect the focal length of the optical image capturing lens assembly.

The detailed optical data of the 8th embodiment are shown in Table 15 and the aspheric surface data are shown in Table 16 below.

TABLE 15

8th Embodiment
f = 1.43 mm, Fno = 2.80, HFOV = 46.7 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | −2.245 | ASP | 0.482 | Plastic | 1.544 | 55.9 | 4.04 |
| 2 | | −1.194 | ASP | 0.118 | | | | |
| 3 | Lens 2 | −4.986 | ASP | 0.304 | Plastic | 1.544 | 55.9 | −7.60 |
| 4 | | 24.825 | ASP | 0.022 | | | | |
| 5 | Ape. Stop | Plano | | 0.052 | | | | |
| 6 | Lens 3 | −12.784 | ASP | 0.598 | Plastic | 1.544 | 55.9 | 1.07 |
| 7 | | −0.568 | ASP | 0.278 | | | | |
| 8 | Lens 4 | −0.288 | ASP | 0.200 | Plastic | 1.650 | 21.4 | −0.94 |
| 9 | | −0.691 | ASP | 0.090 | | | | |
| 10 | Lens 5 | 0.490 | ASP | 0.391 | Plastic | 1.535 | 56.3 | 1.44 |
| 11 | | 0.981 | ASP | 0.400 | | | | |
| 12 | IR-cut filter | Plano | | 0.145 | Glass | 1.517 | 64.2 | — |
| 13 | | Plano | | 0.254 | | | | |
| 14 | Image | Plano | | — | | | | |

Reference wavelength (d-line) is 587.6 nm.

TABLE 16

Aspheric Coefficients

| | Surface # | | | | |
|---|---|---|---|---|---|
| | 1 | 2 | 3 | 4 | 6 |
| k = | −2.0000E+01 | −1.7046E+01 | −2.0000E+01 | −2.0000E+01 | −1.0000E+00 |
| A4 = | 1.1940E−01 | 1.8355E−01 | 8.5892E−01 | −1.0041E+00 | −1.4392E+00 |

TABLE 16-continued

| Aspheric Coefficients | | | | |
|---|---|---|---|---|
| A6 = | −6.9476E−02 | −4.7040E−01 | −9.4503E+00 | 1.9265E+00 | 1.9038E+00 |
| A8 = | −5.9448E−03 | 9.2478E−01 | 5.1765E+01 | −5.3386E+01 | −1.2871E+02 |
| A10 = | 5.1401E−02 | −1.0675E+00 | −1.5461E+02 | 3.2898E+02 | 1.0463E+03 |
| A12 = | −2.8746E−02 | 7.4997E−01 | 1.8703E+02 | 1.9727E+02 | −3.3211E+03 |
| A14 = | 5.5968E−03 | −2.2306E−01 | 1.7876E−06 | −1.8025E−08 | 5.7411E+03 |

| Surface # | | | | |
|---|---|---|---|---|
| 7 | 8 | 9 | 10 | 11 |
| k = | −6.9626E+00 | −2.8945E+00 | −5.0633E−01 | −6.3911E+00 | −6.2376E−01 |
| A4 = | 3.9847E+00 | −4.2701E+00 | −1.2714E+00 | −5.7752E−03 | −4.2524E−01 |
| A6 = | 1.9266E+01 | 3.8056E+01 | 1.4660E+01 | −9.3468E−01 | −5.1448E−01 |
| A8 = | −7.6550E+01 | −1.6067E+02 | −4.5476E+01 | 2.2461E+00 | 1.7233E+00 |
| A10 = | 1.4142E+02 | 3.6877E+02 | 8.0335E+01 | −3.1225E+00 | −2.3493E+00 |
| A12 = | −1.1610E+02 | −4.2751E+02 | −7.7183E+01 | 2.4613E+00 | 1.6998E+00 |
| A14 = | −3.7429E+00 | 1.5798E−02 | 3.1023E+01 | −9.9674E−01 | −6.5067E−01 |
| A16 = | | | | 1.6249E−01 | 1.0357E−01 |

In the optical image capturing lens assembly according to the 8th embodiment, the definitions of f, Fno, HFOV, V3, V4, R6, CT3, f1, f2, Y11, Y52, Yc11, Yc52, Dist_max, tan $\theta_1$, tan $\theta_2$, and FOV are the same as those stated in the 1st embodiment with corresponding values for the 8th embodiment. Moreover, these parameters can be calculated from Table 15 and Table 16 as the following values and satisfy the following relationships:

| | | | |
|---|---|---|---|
| f (mm) | 1.43 | \|Yc11/Y11\| | 0.83 |
| Fno | 2.80 | \|Yc52/Y52\| | 0.71 |
| HFOV (deg.) | 46.7 | tan$\theta_1$ | 0.076 |
| V3 − V4 | 34.5 | tan$\theta_2$ | 0.197 |
| R6/CT3 | −0.95 | Dist (max) (%) | 2.08 |
| \|f/f1\| + f/f2\| | 0.54 | FOV (deg.) | 93.4 |
| \|Y11/Y52\| | 0.90 | | |

9th Embodiment

Figure 17:
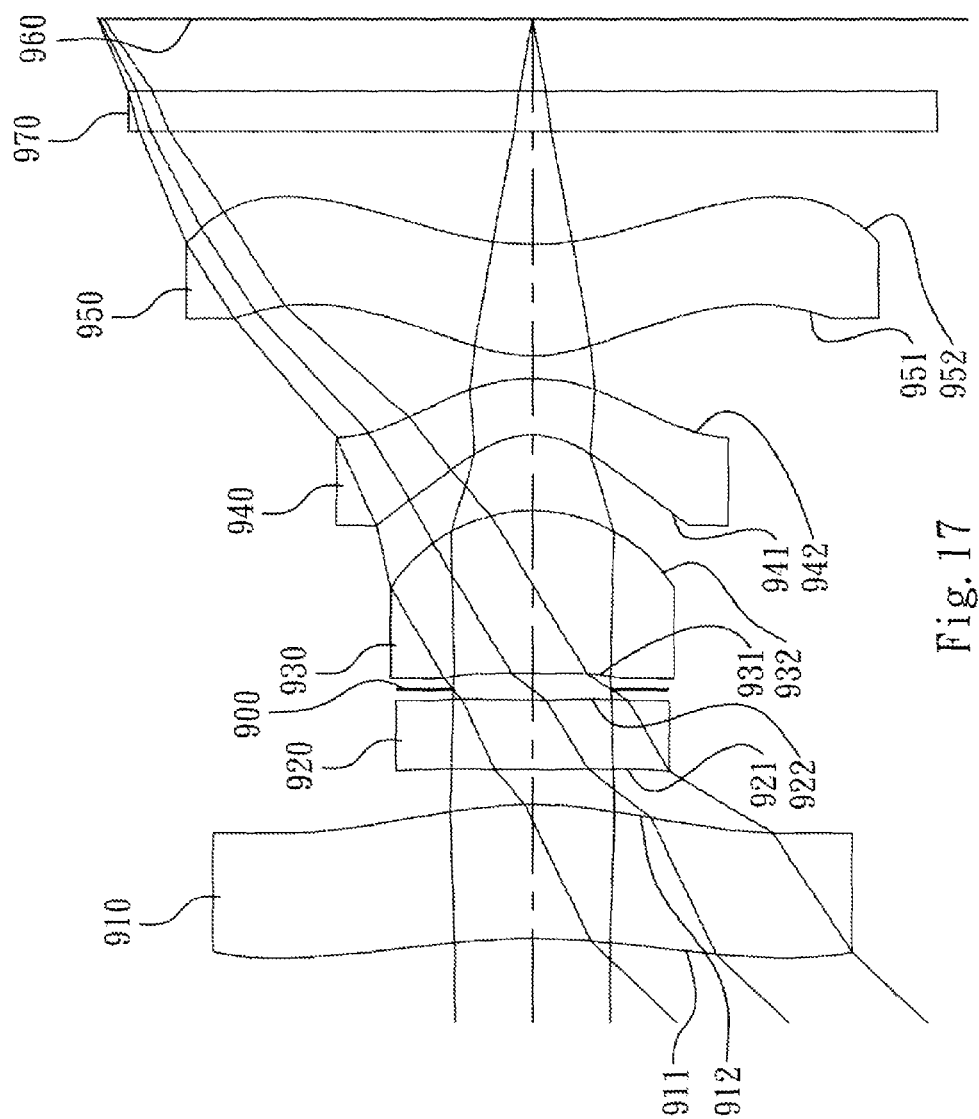
FIG. 17 is a schematic view of an optical image capturing lens assembly according to the 9th embodiment of the present disclosure.
Figure 18:
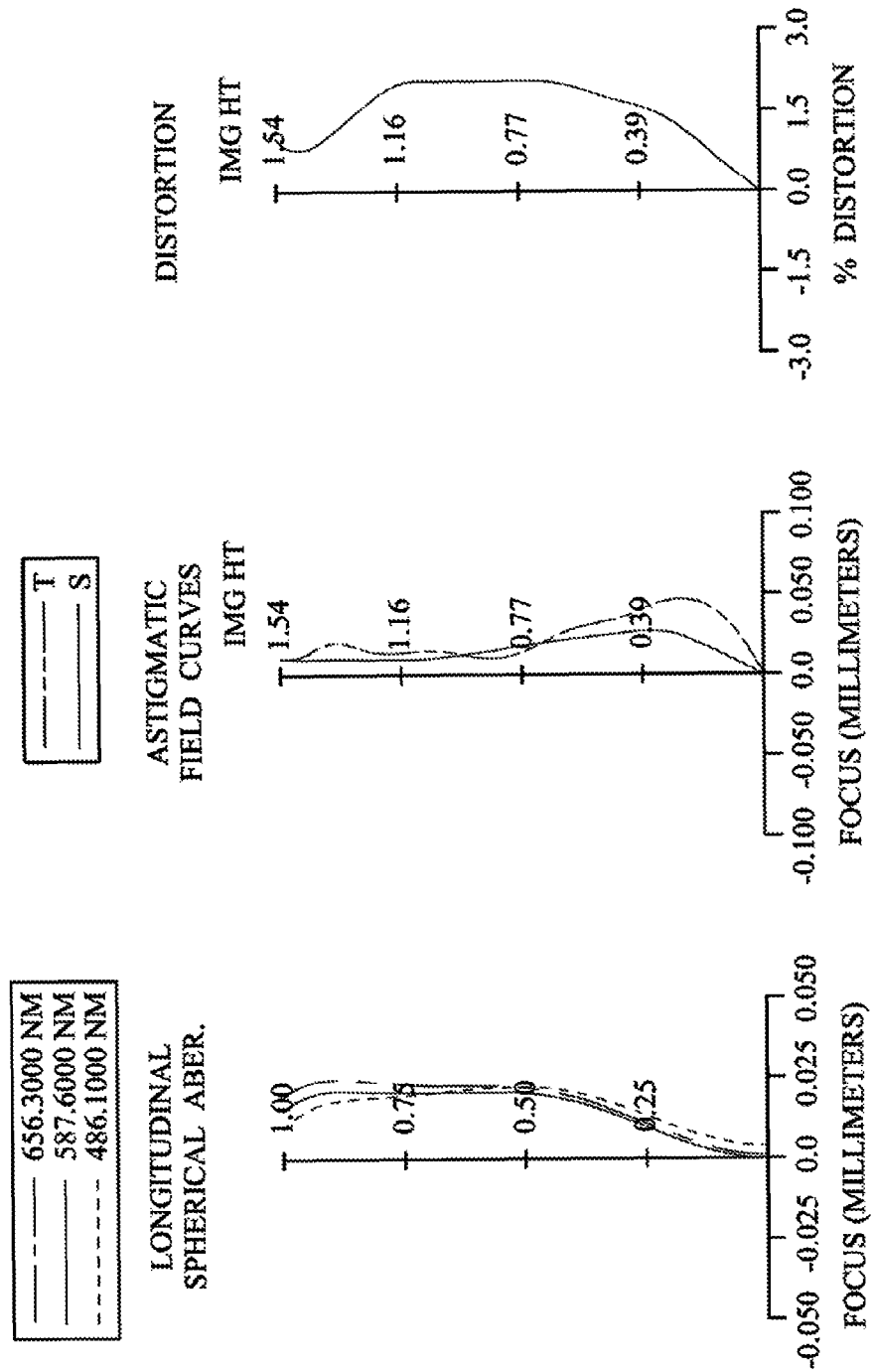
FIG. 18 shows spherical aberration curves, astigmatic field curves and a distortion curve of the optical image capturing lens assembly according to the 9th embodiment.

FIG. 17 is a schematic view of an optical image capturing lens assembly according to the 9th embodiment of the present disclosure. FIG. 18 shows spherical aberration curves, astigmatic field curves and a distortion curve of the optical image capturing lens assembly according to the 9th embodiment. In FIG. 17, the optical image capturing lens assembly includes, in order from an object side to an image side, a first lens element 910, a second lens element 920, an aperture stop 900, a third lens element 930, a fourth lens element 940, a fifth lens element 950, an IR-cut filter 970 and an image plane 960.

The first lens element 910 with positive refractive power has a concave object-side surface 911 at a paraxial region and a convex image-side surface 912 at a paraxial region, wherein the object-side surface 911 of the first lens element 910 changes from concave at the paraxial region to convex at a peripheral region. The first lens element 910 is made of plastic material and has the object-side surface 911 and the image-side surface 912 being aspheric.

The second lens element 920 with negative refractive power has a convex object-side surface 921 and a concave image-side surface 922. The second lens element 920 is made of plastic material and has the object-side surface 921 and the image-side surface 922 being aspheric.

The third lens element 930 with positive refractive power has a concave object-side surface 931 at a paraxial region and a convex image-side surface 932 at a paraxial region. The third lens element 930 is made of plastic material and has the object-side surface 931 and the image-side surface 932 being aspheric.

The fourth lens element 940 with negative refractive power has a concave object-side surface 941 at a paraxial region and a convex image-side surface 942 at a paraxial region. The fourth lens element 940 is made of plastic material and has the object-side surface 941 and the image-side surface 942 being aspheric.

The fifth lens element 950 with positive refractive power has a convex object-side surface 951 at a paraxial region and a concave image-side surface 952 at a paraxial region, wherein the image-side surface 952 of the fifth lens element 950 changes from concave at the paraxial region to convex at a peripheral region. The fifth lens element 950 is made of plastic material and has the object-side surface 951 and the image-side surface 952 being aspheric.

The IR-cut filter 970 is made of glass material, wherein the IR-cut filter 970 is located between the fifth lens element 950 and the image plane 960, and will not affect the focal length of the optical image capturing lens assembly.

The detailed optical data of the 9th embodiment are shown in Table 17 and the aspheric surface data are shown in Table 18 below.

TABLE 17

9th Embodiment
f = 1.44 mm, Fno = 2.60, HFOV = 46.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −2.346 | ASP | 0.479 | Plastic | 1.544 | 55.9 | 4.58 |
| 2 | | −1.295 | ASP | 0.123 | | | | |
| 3 | Lens 2 | 39.693 | ASP | 0.248 | Plastic | 1.544 | 55.9 | −8.34 |

TABLE 17-continued

9th Embodiment
f = 1.44 mm, Fno = 2.60, HFOV = 46.5 deg.

| Surface # | | Curvature Radius | | Thickness | Material | Index | Abbe # | Focal length |
|---|---|---|---|---|---|---|---|---|
| 4 | | 4.063 | ASP | 0.037 | | | | |
| 5 | Ape. Stop | Plano | | 0.059 | | | | |
| 6 | Lens 3 | −36.203 | ASP | 0.578 | Plastic | 1.544 | 55.9 | 1.06 |
| 7 | | −0.573 | ASP | 0.268 | | | | |
| 8 | Lens 4 | −0.286 | ASP | 0.201 | Plastic | 1.650 | 21.4 | −0.95 |
| 9 | | −0.679 | ASP | 0.082 | | | | |
| 10 | Lens 5 | 0.494 | ASP | 0.397 | Plastic | 1.535 | 56.3 | 1.44 |
| 11 | | 0.993 | ASP | 0.400 | | | | |
| 12 | IR-cut filter | Plano | | 0.145 | Glass | 1.517 | 64.2 | — |
| 13 | | Plano | | 0.255 | | | | |
| 14 | Image | Plano | | — | | | | |

Reference wavelength (d-line) is 587.6 nm.

TABLE 18

Aspheric Coefficients

| Surface # | | | | |
|---|---|---|---|---|
| 1 | 2 | 3 | 4 | 6 |
| k = −2.0000E+01 | −1.8095E+01 | −2.0000E+01 | −2.0000E+01 | −1.0000E+00 |
| A4 = 1.1805E−01 | 1.6754E−01 | 5.0307E−01 | −1.1409E+00 | −1.3454E+00 |
| A6 = −6.9056E−02 | −4.4473E−01 | −8.3726E+00 | 1.3816E+00 | 2.7284E+00 |
| A8 = −3.2904E−03 | 9.1865E−01 | 4.8082E+01 | −2.8715E+01 | −1.3353E+02 |
| A10 = 4.9974E−02 | −1.0808E+00 | −1.4874E+02 | 1.3957E+02 | 1.0163E+03 |
| A12 = −2.9329E−02 | 7.4600E−01 | 1.8703E+02 | 1.9727E+02 | −3.3211E+03 |
| A14 = 5.9804E−03 | −2.1238E−01 | 1.7876E−06 | −1.7943E−08 | 5.7411E+03 |

| Surface # | | | | |
|---|---|---|---|---|
| 7 | 8 | 9 | 10 | 11 |
| k = −7.1290E+00 | −2.8687E+00 | −5.1285E−01 | −6.6919E+00 | −6.1355E−01 |
| A4 = −3.9715E+00 | −4.2620E+00 | −1.2680E+00 | −1.7683E−02 | −4.2303E−01 |
| A6 = 1.9231E+01 | 3.7997E+01 | 1.4689E+01 | −9.2735E−01 | −5.1625E−01 |
| A8 = −7.6698E+01 | −1.6065E+02 | −4.5445E−01 | 2.2500E+00 | 1.7242E+00 |
| A10 = 1.4078E+02 | 3.6893E+02 | 8.0361E+01 | −3.1221E+00 | −2.3489E+00 |
| A12 = −1.1871E+02 | −4.2739E+02 | −7.7175E+01 | 2.4606E+00 | 1.6994E+00 |
| A14 = −1.3347E+01 | 1.5735E+02 | 3.0977E+01 | −9.9726E−01 | −6.5092E−01 |
| A16 = | | | 1.6230E−01 | 1.0368E−01 |

In the optical image capturing lens assembly according to the 9th embodiment, the definitions of f, Fno, HFOV, V3, V4, R6, CT3, f1, f2, Y11, Y52, Yc11, Yc52, Dist_max, tan $\theta_1$, tan $\theta_2$, and FOV are the same as those stated in the 1st embodiment with corresponding values for the 9th embodiment. Moreover, these parameters can be calculated from Table 17 and Table 18 as the following values and satisfy the following relationships:

| f (mm) | 1.44 | |Yc11/Y11| | 0.80 |
|---|---|---|---|
| Fno | 2.60 | |Yc52/Y52| | 0.71 |
| HFOV (deg). | 46.5 | tan$\theta_1$ | 0.074 |
| V3 − V4 | 34.5 | tan$\theta_2$ | 0.193 |
| R6/CT3 | −0.99 | Dist (max) (%) | 2.07 |
| |f/f1| + |f/f2| | 0.49 | FOV (deg.) | 93.0 |
| |Y11/Y52| | 0.92 | | |

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An optical image capturing lens assembly comprising, in order from an object side to an image side:
a first lens element with refractive power having a concave object-side surface at a paraxial region, wherein the object-side surface of the first lens element changes from concave at the paraxial region to convex at a peripheral region, and the object-side surface and an image-side surface of the first lens element are aspheric;
a second lens element with refractive power;
to a third lens element with positive refractive power;
a fourth lens element with negative refractive power; and
a fifth lens element with positive refractive power having a convex object-side surface at a paraxial region and a concave image-side surface at a paraxial region, wherein the image-side surface of the fifth lens element changes from concave at the paraxial region to convex at a peripheral region, and the object-side surface and the image-side surface of the fifth lens element are aspheric.

2. The optical image capturing lens assembly of claim 1, wherein an object-side surface of the fourth lens element is concave at a paraxial region, and an image-side surface of the fourth lens element is convex at a paraxial region.

3. The optical image capturing lens assembly of claim 2, wherein the image-side surface of the first lens element is convex at a paraxial region, and an image-side surface of the third lens element is convex at a paraxial region.

4. The optical image capturing lens assembly of claim 3, wherein a minimum distance between an optical axis and a non-axial critical point on the image-side surface of the fifth lens element is Yc52, an optical effective radius of the image-side surface of the fifth lens element is Y52, and the following relationship is satisfied:

$$0.60 < |Yc52/Y52| \le 1.0.$$

5. The optical image capturing lens assembly of claim 4, wherein a focal length of the optical image capturing lens assembly is f, a focal length of the first lens element is f1, a focal length of the second lens element is f2, and the following relationship is satisfied:

$$0 < |f/f1| + |f/f2| < 0.8.$$

6. The optical image capturing lens assembly of claim 4, wherein an optical effective radius of the object-side surface of the first lens element is Y11, the optical effective radius of the image-side surface of the fifth lens element is Y52, and the following relationship is satisfied:

$$0.7 < |Y11/Y52| < 1.2.$$

7. The optical image capturing lens assembly of claim 4, wherein a curvature radius of the image-surface of the third lens element is R6, a central thickness of the third lens element is CT3, and the following relationship is satisfied:

$$-1.3 < R6/CT3 < -0.50.$$

8. The optical image capturing lens assembly of claim 2, wherein a minimum distance between an optical axis and a non-axial critical point on the object-side surface of the first lens element is Yc11, an optical effective radius of the object-side surface of the first lens element is Y11, and the following relationship is satisfied:

$$0.55 < |Yc11/Y11| \le 1.0.$$

9. The optical image capturing lens assembly of claim 8, wherein the minimum distance between the optical axis and the non-axial critical point on the object-side surface of the first lens element is Yc11, a distance parallel to the optical axis between the optical axis and the non-axial critical point on the object-side surface of the first lens element is SAGc11, wherein SAGc11/Yc11 is a tangent value of an angle $\theta_1$, and the following relationship is satisfied:

$$0 < \tan \theta_1 < 0.30.$$

10. The optical image capturing lens assembly of claim 3, wherein the first lens element has positive refractive power.

11. The optical image capturing lens assembly of claim 10, wherein an Abbe number of the third lens element is V3, an Abbe number of the fourth lens element is V4, and the following relationship is satisfied:

$$25.0 < V3 - V4 < 48.0.$$

12. The optical image capturing lens assembly of claim 10, wherein a maximal field of view of the optical image capturing lens assembly is FOV, and the following relationship is satisfied:

$$80 \text{ degrees} < FOV < 115 \text{ degrees}.$$

13. The optical image capturing lens assembly of claim 12, wherein a maximal distortion of an imaging range of the optical image capturing lens assembly is Dist_max, and the following relationship is satisfied:

$$|Dist\_max| < 3\%.$$

14. The optical image capturing lens assembly of claim 10, wherein a minimum distance between an optical axis and a non-axial critical point on the object-side surface of the first lens element is Yc11, a distance parallel to the optical axis between the optical axis and the non-axial critical point on the object-side surface of the first lens element is SAGc11, a minimum distance between the optical axis and a non-axial critical point on the image-side surface of the fifth lens element is Yc52, a distance parallel to the optical axis between the optical axis and the non-axial critical point on the image-side surface of the fifth lens element is SAGc52, wherein SAGc11/Yc11 is a tangent value of the angle $\theta_1$, SAGc52/Yc52 is a tangent value of an angle $\theta_2$, and the following relationship is satisfied:

$$\tan \theta_1 < \tan \theta_2.$$

15. The optical image capturing lens assembly of claim 10, wherein a curvature radius of the object-side surface of the first lens element is Ro1, a curvature radius of the image-side surface of the first lens element is Ri1, a curvature radius of an object-side surface of the second lens element is Ro2, a curvature radius of an image-side surface of the second lens element is Ri2, a curvature radius of an object-side surface of the third lens element is Ro3, the curvature radius of the image-side surface of the third lens element is Ri3, a curvature radius of the object-side surface of the fourth lens element is Ro4, a curvature radius of the image-side surface of the fourth lens element is Ri4, a curvature radius of the object-side surface of the fifth lens element is Ro5, a curvature radius of the image-side surface of the fifth lens element is Ri5, and the following relationships are satisfied:

$$0 < Ro1/Ri1;$$

$$0 < Ro2/Ri2;$$

$$0 < Ro3/Ri3;$$

$$0 < Ro4/Ri4; \text{ and}$$

$$0 < Ro5/Ri5.$$

16. An optical image capturing lens assembly comprising, in order from an object side to an image side:
a first lens element with refractive power having a concave object-side surface at a paraxial region, wherein the object-side surface and an image-side surface of the first lens element are aspheric;
a second lens element with refractive power;
a third lens element with positive refractive power;
a fourth lens element with negative refractive power, and
a fifth lens element with positive refractive power having a convex object-side surface at a paraxial region and a concave image-side surface at a paraxial region, wherein the image-side surface of the fifth lens element changes from concave at the paraxial region to convex at a peripheral region, and the object-side surface and the image-side surface of the fifth lens element are aspheric;
wherein an optical effective radius of the object-side surface of the first lens element is Y11, an optical effective radius of the image-side surface of the fifth lens element is Y52, and the following relationship is satisfied:

$$0.7 < |Y11/Y52| < 1.2.$$

17. The optical image capturing lens assembly of claim 16, wherein an image-side surface of the first lens element is convex at a paraxial region.

18. The optical image capturing lens assembly of claim 17, wherein the object-side surface of the first lens element changes from concave at the paraxial region to convex at a peripheral region.

19. The optical image capturing lens assembly of claim 17, wherein a minimum distance between an optical axis and a non-axial critical point on the object-side surface of the first lens element is Yc11, a distance parallel to the optical axis between the optical axis and the non-axial critical point on the object-side surface of the first lens element is SAGc11, wherein SAGc11/Yc11 is a tangent value of an angle $\theta_1$, and the following relationship is satisfied:

$0<\tan\theta_1<0.30.$

20. The optical image capturing lens assembly of claim 17, a focal length of the optical image capturing lens assembly is f, a focal length of the first lens element is f1, a focal length of the second lens element is f2, and the following relationship is satisfied:

$0<|f/f1|+|f/f2|<0.8.$

21. The optical image capturing lens assembly of claim 20, where an Abbe number of the third lens element is V3, an Abbe number of the fourth lens element is V4, and the following relationship is satisfied:

$32.0<V3-V4<48.0.$

22. The optical image capturing lens assembly of claim 20, wherein an object-side surface of the fourth lens element is concave, and an image-side surface of the fourth lens element is convex.

23. The optical image capturing lens assembly of claim 20, wherein a maximal field of view of the optical image capturing lens assembly is FOV, and the following relationship is satisfied:

80 degrees<FOV<115 degrees.

24. The optical image capturing lens assembly of claim 20, wherein a maximal distortion of an imaging range of the optical image capturing lens assembly is Dist_max, and the following relationship is satisfied:

|Dist_max|<3%.

25. The optical image capturing lens assembly of claim 16, wherein a minimum distance between an optical axis and a non-axial critical point on the object-side surface of the first lens element is Yc11, a distance parallel to the optical axis between the optical axis and the non-axial critical point on the object-side surface of the first lens element is SAGc11, a minimum distance between the optical axis and a non-axial critical point on the image-side surface of the fifth lens element is Yc52, a distance parallel to the optical axis between the optical axis and the non-axial critical point on the image-side surface of the fifth lens element is SAGc52, wherein SAGc11/Yc11 is a tangent value of an angle $\theta_1$, SAGc52/Yc52 is a tangent value of an angle $\theta_2$, and the following relationship is satisfied:

$\tan\theta_1<\tan\theta_2.$

26. An optical image capturing lens assembly comprising, in order from an object side to an image side:

a first lens element with refractive power having a concave object-side surface at a paraxial region, wherein the object-side surface of the first lens element changes from concave at the paraxial region to convex at a peripheral region, and the object-side surface and an image-side surface of the first lens element are aspheric;
a second lens element with refractive power;
a third lens element with positive refractive power;
a fourth lens element with negative refractive power, and
a fifth lens element with positive refractive power having a convex object-side surface at a paraxial region and a concave image-side surface at a paraxial region, wherein the image-side surface of the fifth lens element changes from concave at the paraxial region to convex at a peripheral region, and the object-side surface and the image-side surface of the fifth lens element are aspheric;
wherein a minimum distance between an optical axis and a non-axial critical point on the object-side surface of the first lens element is Yc11, a distance parallel to the optical axis between the optical axis and the non-axial critical point on the object-side surface of the first lens element is SAGc11, a minimum distance between the optical axis and a non-axial critical point on the image-side surface of the fifth lens element is Yc52, a distance parallel to the optical axis between the optical axis and the non-axial critical point on the image-side surface of the fifth lens element is SAGc52, wherein SAGc11/Yc11 is a tangent value of an angle $\theta_1$, SAGc52/Yc52 is a tangent value of an angle $\theta_2$, and the following relationships are satisfied:

$0<\tan\theta_1<0.3;$ and $0<\tan\theta_2<0.5.$

27. The optical image capturing lens assembly of claim 26, wherein an object-side surface of the fourth lens element is concave at a paraxial region, an image-side surface of the fourth lens element is convex at a paraxial region, and the image-side surface of the first lens element is convex at a paraxial region.

28. The optical image capturing lens assembly of claim 26, wherein an optical effective radius of the object-side surface of the first lens element is Y11, an optical effective radius of the image-side surface of the fifth lens element is Y52, and the following relationship is satisfied:

$0.7<|Y11/Y52|<1.2.$

29. The optical image capturing lens assembly of claim 26, wherein a focal length of the optical image capturing lens assembly is f, a focal length of the first lens element is f1, a focal length of the second lens element is f2, and the following relationship is satisfied:

$0<|f/f1|+|f/f2|<0.8.$

30. The optical image capturing lens assembly of claim 26, wherein a curvature radius of an image-side surface of the third lens element is R6, a central thickness of the third lens element is CT3, and the following relationship is satisfied:

$-1.3<R6/CT3<-0.50.$

* * * * *

UNITED STATES PATENT AND TRADEMARK OFFICE
CERTIFICATE OF CORRECTION

PATENT NO. : 8,743,480 B2  
APPLICATION NO. : 13/677319  
DATED : June 3, 2014  
INVENTOR(S) : Hsueh et al.

Page 1 of 1

It is certified that error appears in the above-identified patent and that said Letters Patent is hereby corrected as shown below:

In the Claims

Column 32, Claim 1, line 53, "to a" should read --a--.

Signed and Sealed this  
Twenty-third Day of September, 2014

Michelle K. Lee  
*Deputy Director of the United States Patent and Trademark Office*